US012222811B2

(12) United States Patent
Allen et al.

(10) Patent No.: US 12,222,811 B2
(45) Date of Patent: Feb. 11, 2025

(54) SELF-HEALING HARD DISK DRIVE SYSTEM

(71) Applicant: Dell Products L.P., Round Rock, TX (US)

(72) Inventors: Gregory Martin Allen, Layton, UT (US); Frank Widjaja Yu, Austin, TX (US); Walter A. O'Brien, III, Westborough, MA (US); Marcelo Silva Saraiva, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/128,790

(22) Filed: Mar. 30, 2023

(65) Prior Publication Data
US 2024/0330110 A1    Oct. 3, 2024

(51) Int. Cl.
| | |
|---|---|
| *G06F 11/00* | (2006.01) |
| *G06F 3/06* | (2006.01) |
| *G06F 11/10* | (2006.01) |
| *G06F 11/20* | (2006.01) |

(52) U.S. Cl.
CPC ........ *G06F 11/1092* (2013.01); *G06F 3/0617* (2013.01); *G06F 3/0619* (2013.01); *G06F 3/0638* (2013.01); *G06F 3/065* (2013.01); *G06F 3/0676* (2013.01); *G06F 11/1088* (2013.01); *G06F 11/2094* (2013.01)

(58) Field of Classification Search
CPC .... G06F 3/0619; G06F 3/0617; G06F 3/0646; G06F 3/0647; G06F 3/065; G06F 3/0676; G06F 3/0689; G06F 3/0683; G06F 11/1088; G06F 11/1092; G06F 11/2094; G06F 11/008
See application file for complete search history.

(56) References Cited

U.S. PATENT DOCUMENTS

| | | | |
|---|---|---|---|
| 6,546,499 B1 | 4/2003 | Challener et al. | |
| 7,574,623 B1* | 8/2009 | Goel | G06F 11/008 714/47.2 |
| 9,542,296 B1* | 1/2017 | Engers | G06F 11/008 |
| 2007/0276997 A1* | 11/2007 | Luning | G06F 11/201 711/114 |
| 2018/0101456 A1* | 4/2018 | Critchley | G06F 11/2058 |
| 2021/0149777 A1* | 5/2021 | Gao | G06F 11/079 |

* cited by examiner

*Primary Examiner* — Marc Duncan
(74) *Attorney, Agent, or Firm* — Joseph Mencher

(57) ABSTRACT

A self-healing Hard Disk Drive (HDD) system includes a chassis housing an HDD device self-healing subsystem coupled to an HDD data storage system that includes a plurality of HDD data storage resources. The HDD device self-healing subsystem prevents data from being stored on a first HDD data storage resource that is included in the plurality of HDD data storage resources included in the HDD data storage system. When the HDD device self-healing subsystem determines that data storage operations using a second HDD data storage resource that is included in the plurality of HDD data storage resources will be subsequently unavailable, it remaps logical addresses associated with the second HDD data storage resource to the first HDD data storage resource, and provides the data that was stored using the second HDD data storage resource on the first HDD data storage resource.

20 Claims, 21 Drawing Sheets

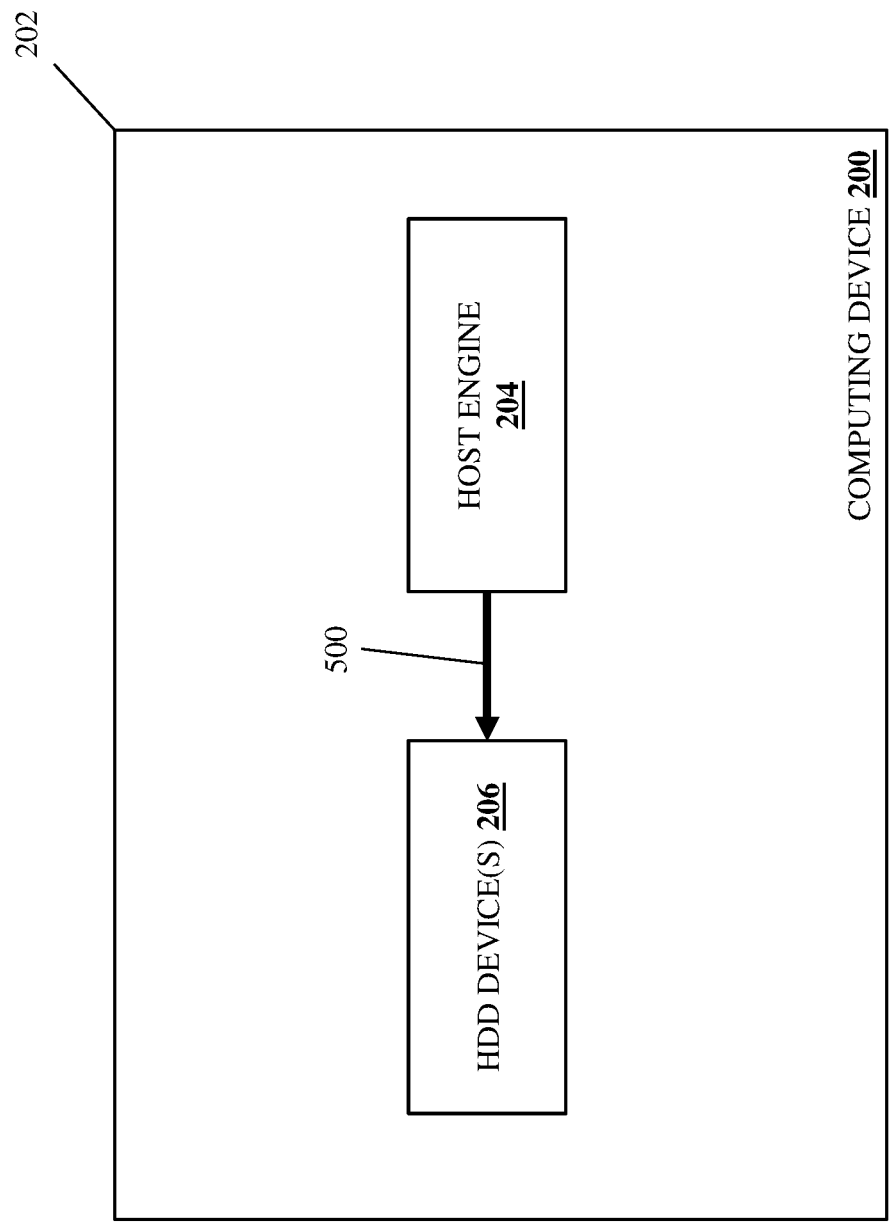

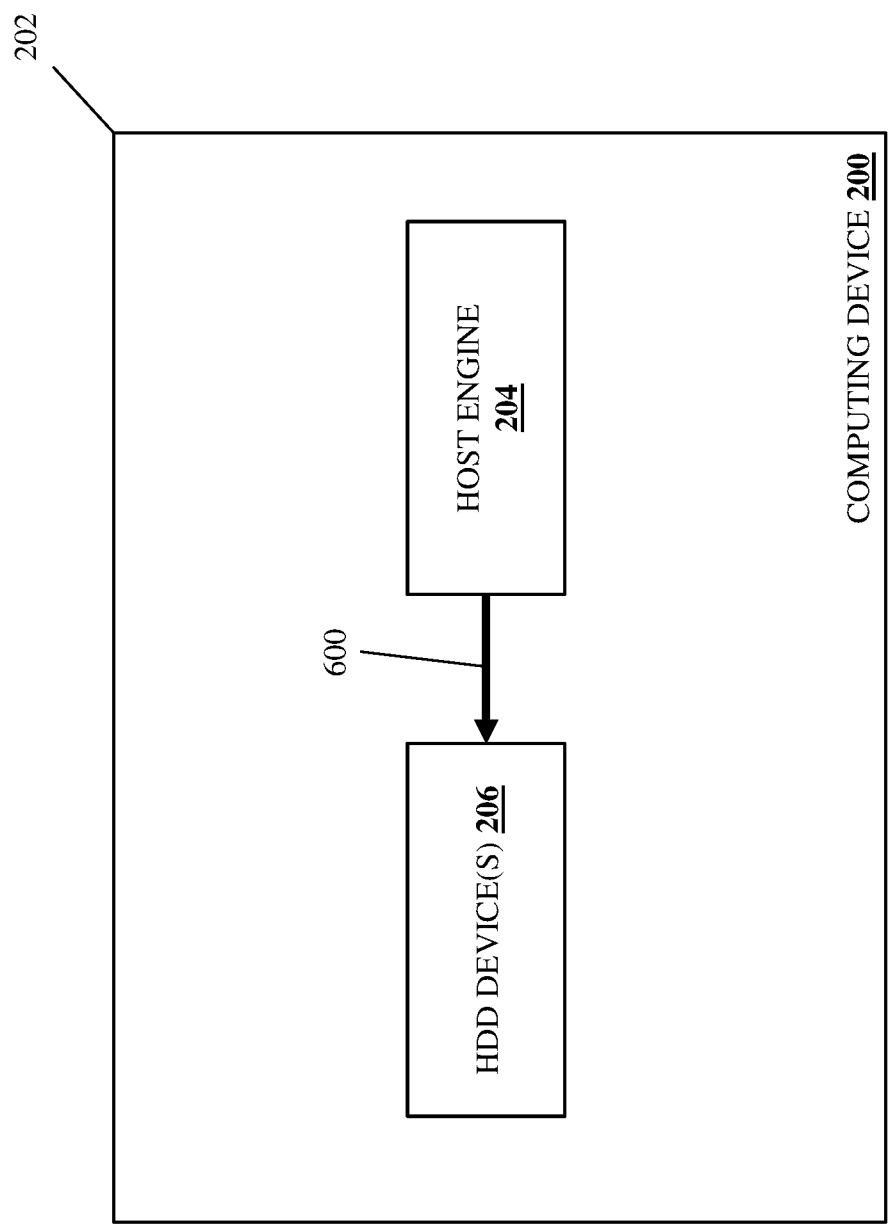

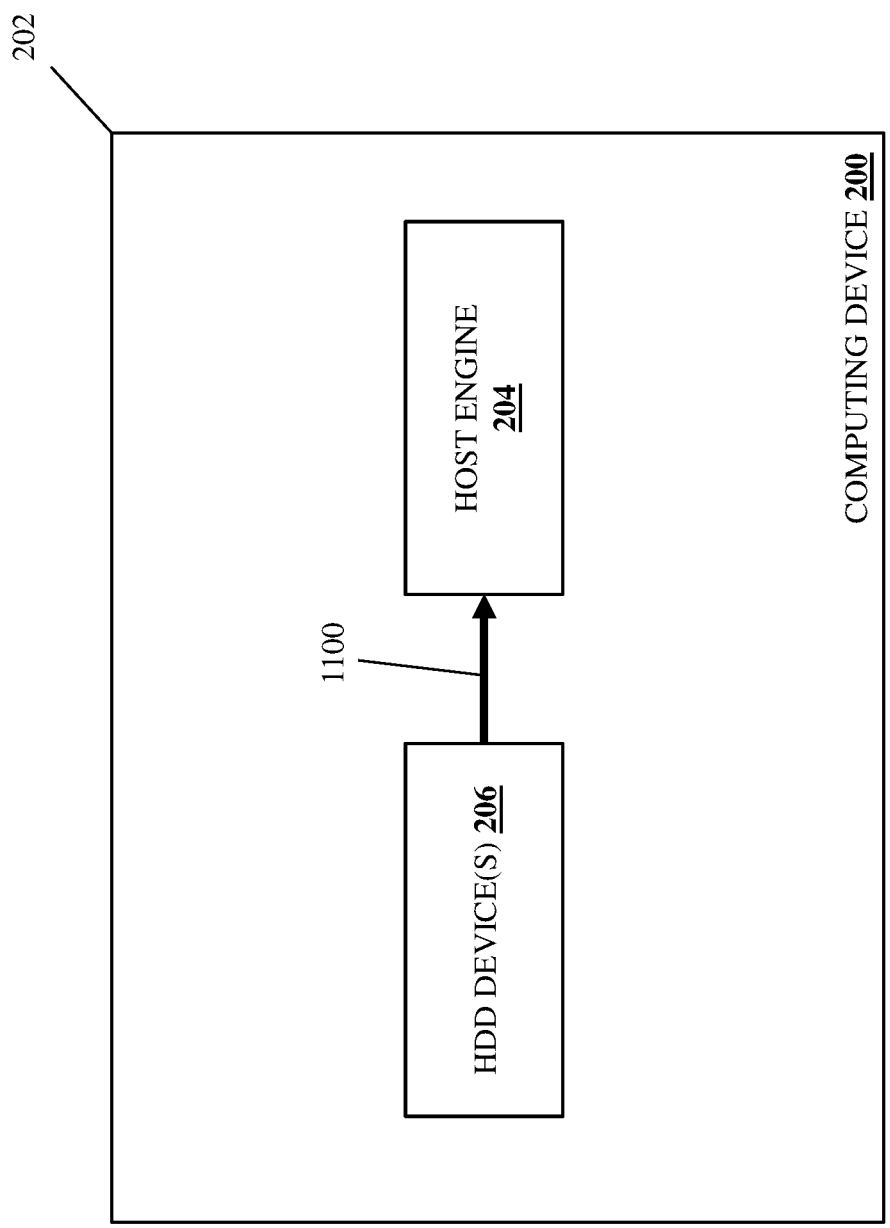

SELF-HEALING HARD DISK DRIVE SYSTEM

BACKGROUND

The present disclosure relates generally to information handling systems, and more particularly to self-healing hard disk drive devices in information handling systems that are capable of recovering from unavailability of their data storage resources without user intervention.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as server devices, desktop computing devices, laptop/notebook computing devices, and/or other computing devices known in the art, utilize storage devices such as Hard Disk Drive (HDD) devices to store data. HDD devices continue to increase in complexity in order to achieve higher storage capacities. For example, conventional HDD devices on the market today may include up to 10 storage platters that each include 2 data storage surfaces, with 20 respective heads each having a read element and a write element provided for each of those data storage surfaces. As will be appreciated by one of skill in the art in possession of the present disclosure, HDDs with large numbers of HDD data storage resources (e.g., 20 HDD data storage resources each provided by a data storage surface/read element/write element combination in the example discussed above) present reliability issues. For example, relatively high numbers of HDD data storage resources in HDD devices increase the probability of the HDD device failing or otherwise becoming unavailable due to failure or other unavailability of any of the HDD data storage resources (e.g., due to a failed/unavailable data storage surface (e.g., a scratched data storage surface), a failed/unavailable read element, and/or a failed/unavailable write element). Furthermore, new technologies being introduced to enable the increases in data storage capacity of HDD devices discussed above such as, for example, Heat Assisted Magnetic Recording (HAMR), utilize relatively lower reliability HDD data storage resources (e.g., lower reliability write elements in the case of HAMR technologies) that will exacerbate the reliability issues with HDD devices discussed above.

Some conventional HDD devices include "repurposing depopulation" functionality that prevents the use of failed HDD data storage resources in HDD devices in order to extend the life of those HDD devices, which may allow the HDD device to function while providing a lower HDD storage capacity (i.e., an HDD storage capacity that is reduced by the HDD data storage resource storage capacity of the failed HDD data storage resource). However, the reduction of HDD storage capacity of an HDD device being used in a computing device can present issues for software stack(s) provided in that computing device. For example, Redundant Array of Independent Disk (RAID) software stacks utilized in RAID storage systems require fixed capacity storage devices and may not operate correctly if one of the HDD devices utilized in the RAID storage system changes capacity using the repurposing depopulation functionality described above. Furthermore, the failure/unavailability of an HDD data storage resource in an HDD device conventionally requires a relatively high amount of host involvement in rebuilding the data/storage capacity lost due to that failure/unavailability. Further still, computing devices that utilize a single HDD device require relatively high-reliability HDD devices, as they cannot rely on such computing-system-level redundancy and data/storage capacity rebuild functionality.

Accordingly, it would be desirable to provide a Hard Disk Drive (HDD) system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Hard Disk Drive (HDD) device self-healing engine that is configured to: prevent data from being stored on a first HDD data storage resource that is included in a plurality of HDD data storage resources included in an HDD data storage system in an HDD device; determine that data storage operations using a second HDD data storage resource that is included in the plurality of HDD data storage resources will be subsequently unavailable; remap logical addresses associated with the second HDD data storage resource to the first HDD data storage resource; and provide the data that was stored using the second HDD data storage resource on the first HDD data storage resource.

BRIEF DESCRIPTION OF THE DRAWINGS

FIG. 5A is a schematic view illustrating an embodiment of the computing device of FIG. 2 operating during the method of FIG. 4.

FIG. 6A is a schematic view illustrating an embodiment of the computing device of FIG. 2 operating during the method of FIG. 4.

FIG. 11B is a schematic view illustrating an embodiment of the computing device of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
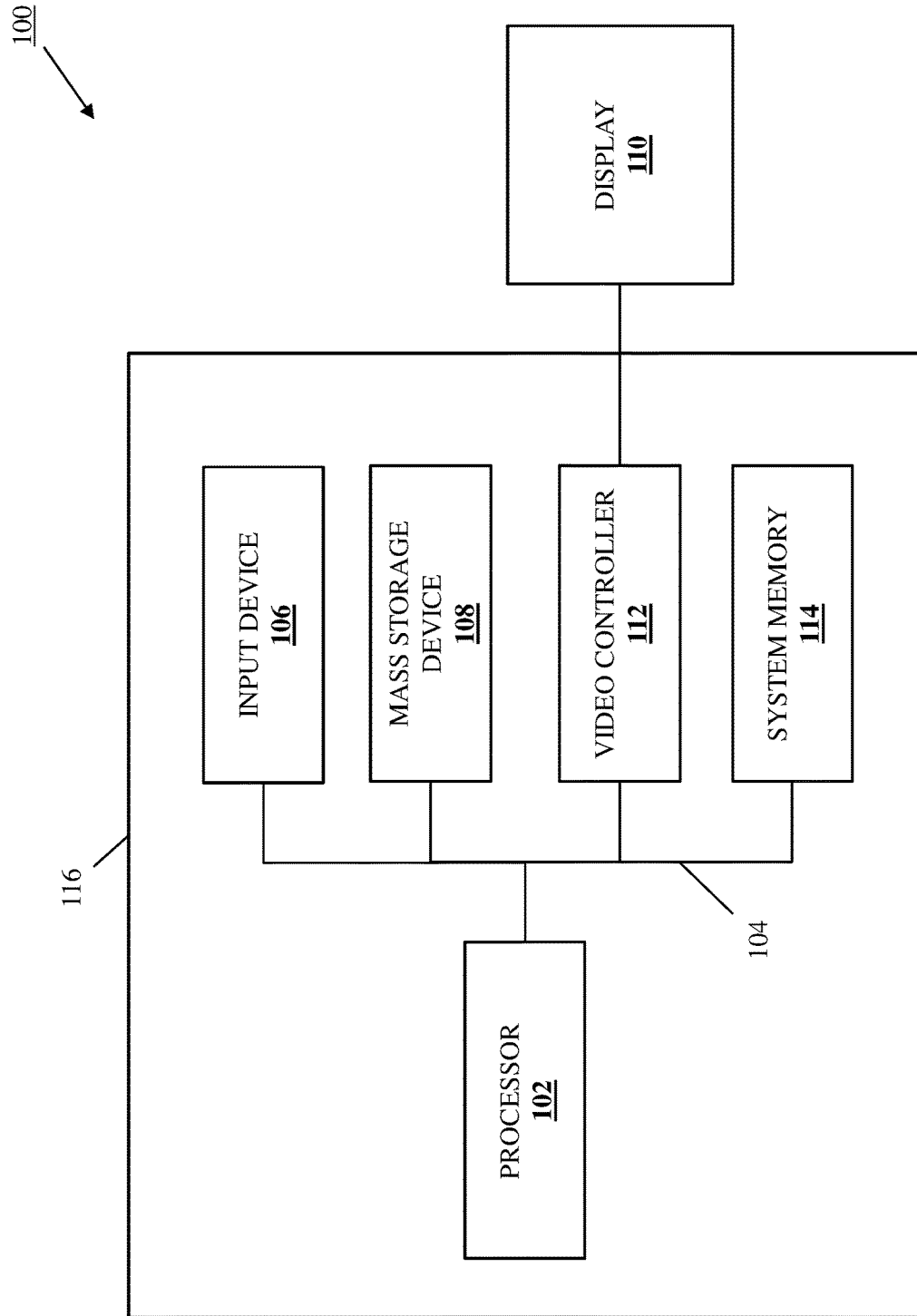
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
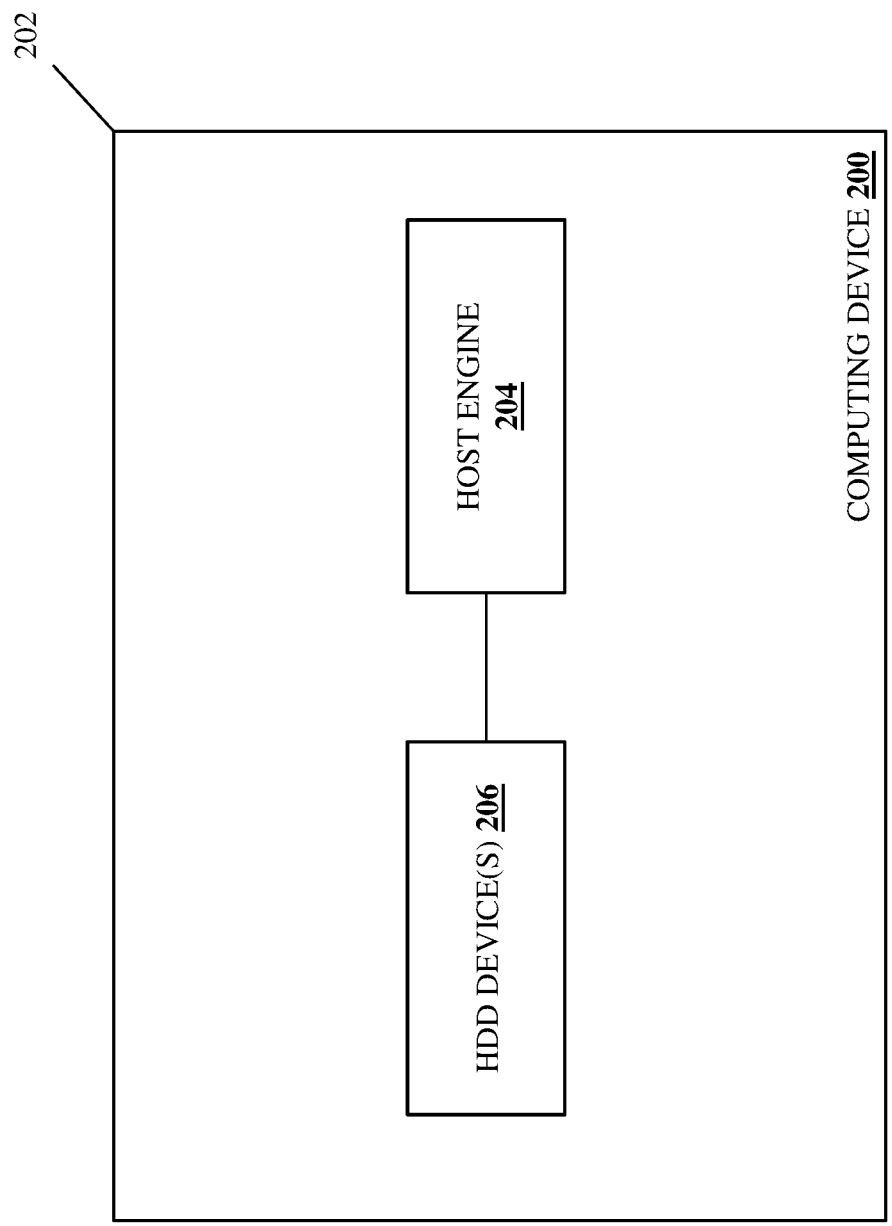
FIG. 2 is a schematic view illustrating an embodiment of a computing device that may include the self-healing HDD system of the present disclosure.

Referring now to FIG. 2, an embodiment of a computing device 200 is illustrated that may include the self-healing HDD system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing device, storage systems, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host engine 204 that is configured to perform the functionality of the host engines and/or computing devices discussed below. To provide some specific examples, the functionality of the host engine 204 discussed below may be provided using a Central Processing Unit (CPU) in the computing device 200, a Redundant Array of Independent Disk (RAID) controller, a storage array controller, and/or other host subsystems that one of skill in the art in possession of the present disclosure would recognize as performing any of the host functionality described below.

The chassis 202 may also house one or more HDD devices 206 that are coupled to the host engine 204 (e.g., via a coupling between the HDD device(s) 206 and the processing system) and that may provide the self-healing HDD system discussed in further detail below. As discussed below, some embodiments of the present disclosure may include a plurality of HDD devices that provide a redundant storage system (e.g., a RAID system) in the computing device 200, while other embodiments of the present disclosure may include a single HDD device in the computing device 200. Furthermore, while only HDD device(s) 206 are illustrated and described herein, one of skill in the art in possession of the present disclosure will appreciate how the computing device 200 may include a storage system having storage devices utilizing other storage device technologies (e.g., Solid State Drive (SSD) devices) while remaining within the scope of the present disclosure as well. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the self-healing HDD device functionality discussed below, while remaining within the scope of the present disclosure as well.

Figure 3:
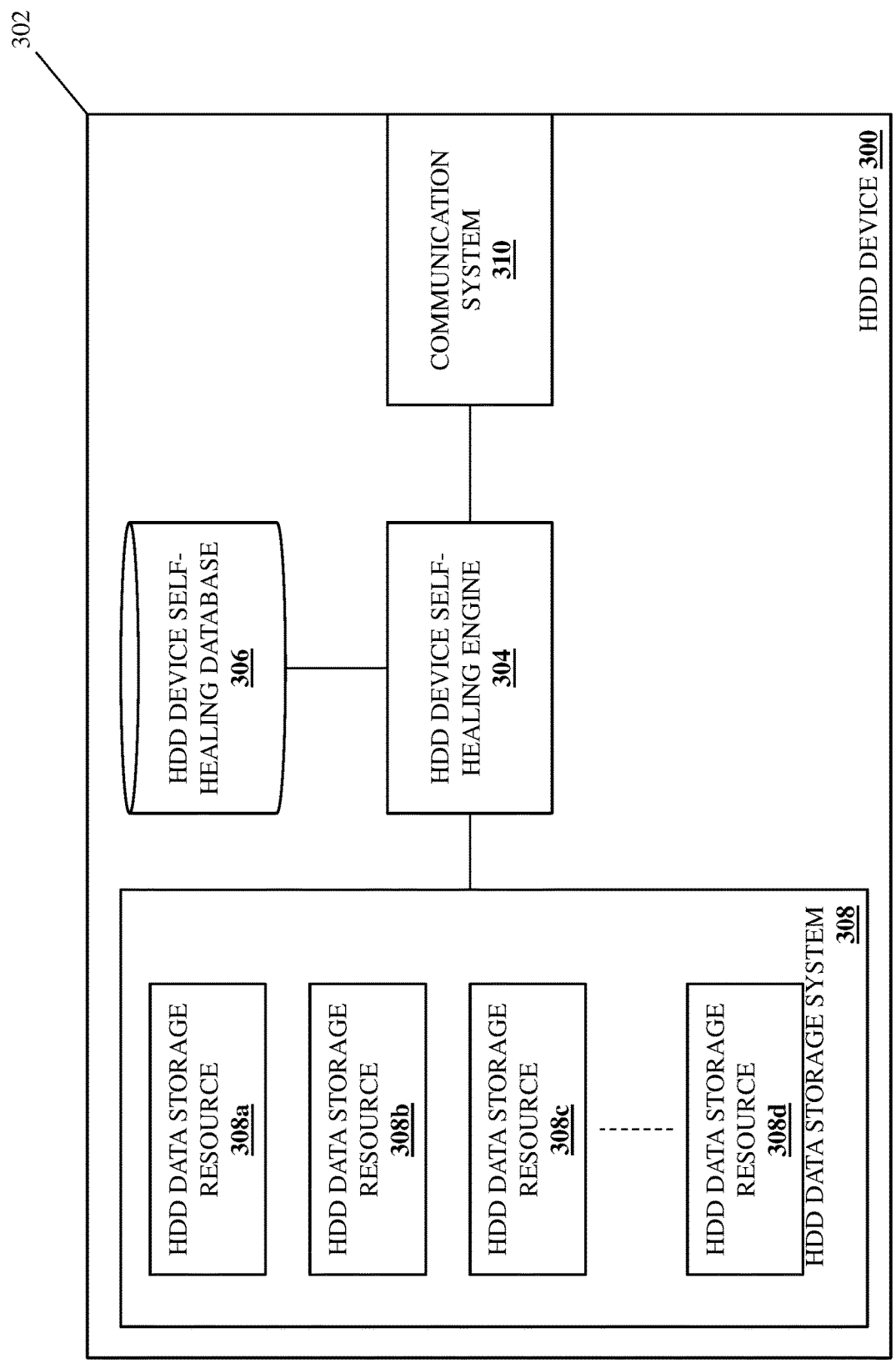
FIG. 3 is a schematic view illustrating an embodiment of an HDD device that may be included in the computing device of FIG. 2 and that may provide the HDD system of the present disclosure.

Referring now to FIG. 3, an embodiment of an HDD device 300 is illustrated that may provide any of the HDD devices 206 discussed above with reference to FIG. 2. As such, the HDD device 300 may be provided by in the IHS 100 discussed above with reference to FIG. 1 and/or may provide some of the components of the IHS 100. Furthermore, while illustrated and discussed as an HDD device, one of skill in the art in possession of the present disclosure will recognize that the functionality of the HDD device 300 discussed below may be enabled in storage devices utilizing other storage technologies while remaining within the scope of the present disclosure as well. As discussed below, in some specific examples the HDD device 300 may be provided by a Shingled Magnetic Recording (SMR) HDD device. In the illustrated embodiment, the HDD device 300 includes a chassis 302 that houses the components of the HDD device 300, only some of which are illustrated and described below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HDD device self-healing engine 304 that is configured to perform the functionality of the HDD device self-healing engines, HDD device self-healing subsystems, and/or HDD devices discussed below. In a specific example, the HDD device self-healing engine 304 may be provided by an HDD storage controller, HDD device firmware, and/or any other HDD components that would be apparent to one of skill in the art in possession of the present disclosure.

The chassis 302 may also house an HDD device self-healing database 306 that is illustrated as being coupled to the HDD device self-healing engine 304 and that may be configured to store any of the information utilized by the HDD device self-healing engine 304 discussed below. For example, the HDD device self-healing database 306 may be stored in a storage element included in the HDD storage controller, HDD device firmware, and/or any other HDD components that one of skill in the art in possession of the present disclosure would recognize as providing the HDD device self-healing engine 304. However, as will also be appreciated by one of skill in the art in possession of the present disclosure, the HDD device self-healing database 306 may be stored in any storage element that is accessible to the HDD device self-healing engine 304 (e.g., a storage element provided in the HDD data storage system 308 discussed below) while remaining within the scope of the present disclosure as well.

As illustrated, the chassis 302 may also house an HDD data storage system 308 that is coupled to the HDD device self-healing engine 304 (e.g., via a coupling between the HDD data storage system 308 and the processing system) and that includes a plurality of HDD data storage resources 308a, 308b, 308c, and up to 308d. For example, each of the HDD data storage resources may include at least one of a data storage surface, a read element that is configured to read data from a data storage surface, and/or a write element that is configured to write data to a data storage surface. To provide a specific example, the HDD data storage system 308 may include a plurality of data storage platters, with each data storage platter including a pair of data storage surfaces, and with a respective head including a read element and a write element provided for each data storage surface. As such, in some embodiments of the present disclosure, each data storage resource 308a-308d in the HDD data storage system 308 may include combination of a data storage surface, the read element used to read data from that data storage surface, and the write element used to write data to that data storage surface. However, while a specific HDD data storage system 308 and HDD data storage resources 308a-308d have been illustrated and described, one of skill in the art in possession of the present disclosure will appreciate how the HDD data storage resources 308a-308d may include only the data storage surface(s), read element(s), or write element(s) discussed above, different combinations of the data storage surface(s), read element(s), and/or write element(s) discussed above, and/or may include other HDD data storage resources known in the art while remaining within the scope of the present disclosure as well.

The chassis 302 may also house a communication system 310 that is coupled to the HDD device self-healing engine 304 (e.g., via a coupling between the communication system 310 and the processing system) and that may be provided by any of a variety of HDD device communication components that would be apparent to one of skill in the art in possession of the present disclosure. However, while a specific HDD device 300 has been illustrated and described, one of skill in the art in possession of the present disclosure will recognize that HDD devices (or other devices operating according to the teachings of the present disclosure in a manner similar to that described below for the HDD device 300) may include a variety of components and/or component configurations for providing conventional HDD device functionality, as well as the self-healing HDD device functionality discussed below, while remaining within the scope of the present disclosure as well.

Figure 4A:
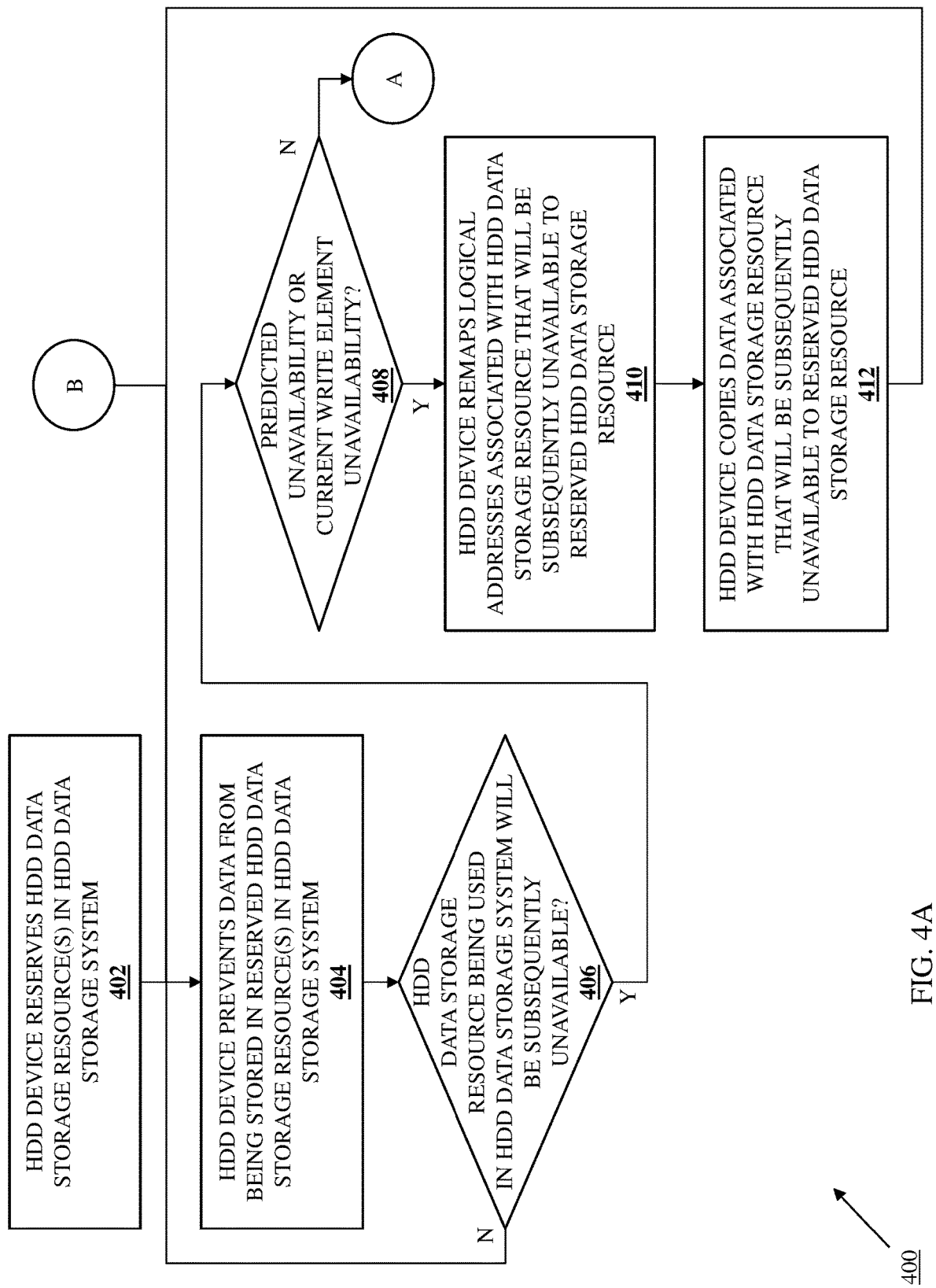
FIG. 4A is a flow chart illustrating an embodiment of a portion of a method for self-healing in an HDD device.
Figure 4B:
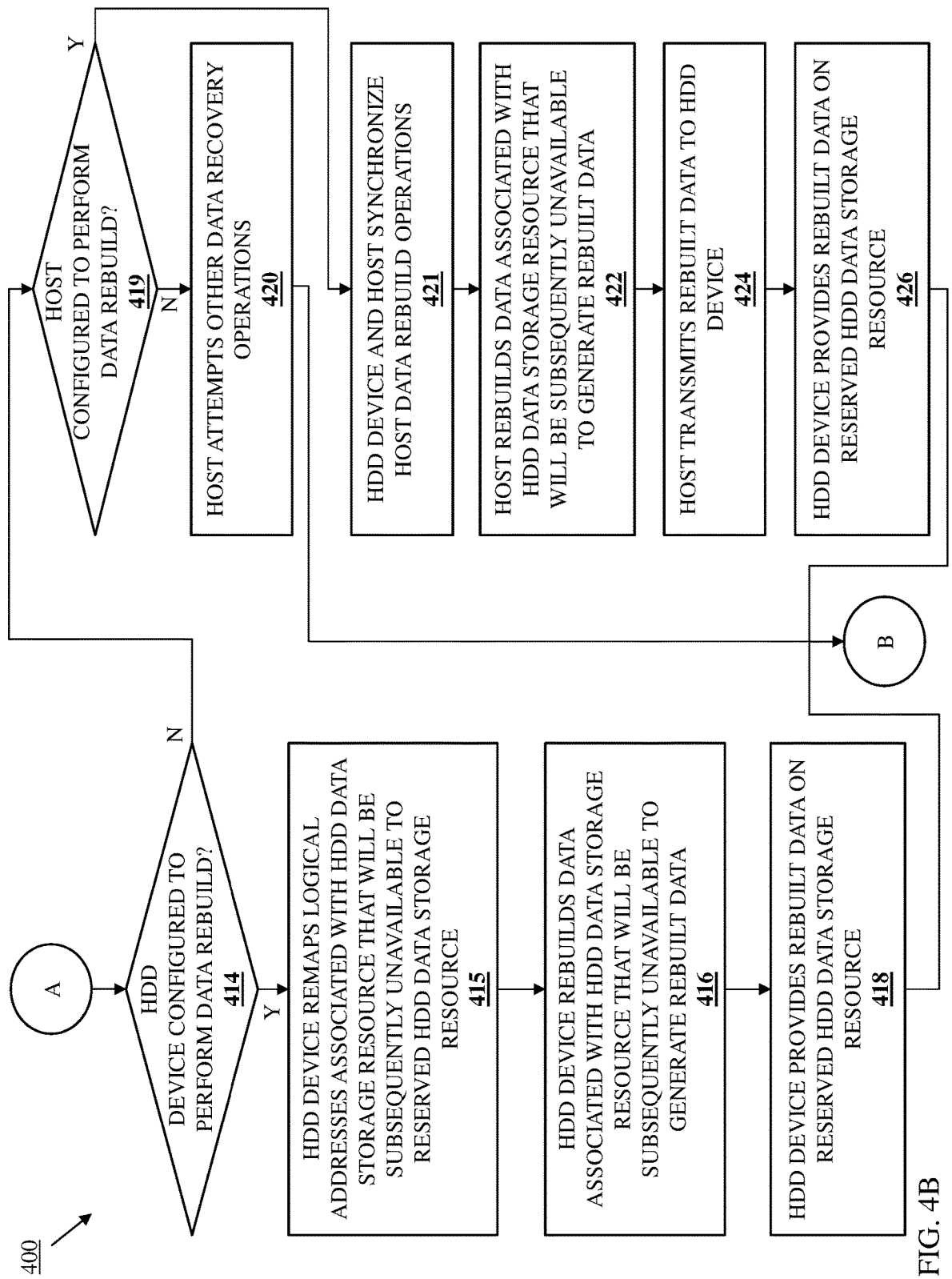
FIG. 4B is a flow chart illustrating an embodiment of a portion of the method for self-healing in an HDD device of FIG. 4A.

Referring now to FIGS. 4A and 4B, an embodiment of a method 400 for self-healing an HDD device is illustrated. As discussed below, the systems and methods of the present disclosure provide for the reserving of HDD data storage resource(s) in an HDD data storage system of an HDD device for use in the event one of the HDD data storage resources currently being used in the HDD device fails or otherwise becomes unavailable. For example, the self-healing HDD system of the present disclosure may include a chassis housing an HDD device self-healing subsystem coupled to an HDD data storage system that includes a plurality of HDD data storage resources. The HDD device self-healing subsystem prevents data from being stored on a first HDD data storage resource that is included in the plurality of HDD data storage resources included in the HDD data storage system. When the HDD device self-healing subsystem determines that data storage operations using a second HDD data storage resource that is included in the plurality of HDD data storage resources will be subsequently unavailable, it remaps logical addresses associated with the second HDD data storage resource to the first HDD data storage resource, and provides the data that was stored using the second HDD data storage resource on the first HDD data storage resource. As such, when an HDD data storage resource currently being used in the HDD device becomes unavailable, the HDD device of the present disclosure may "self-heal" by providing its data on a reserved HDD data storage resource, eliminating many of the issues that occur when HDD data storage resources in conventional HDD devices become unavailable as discussed above.

Figure 5B:
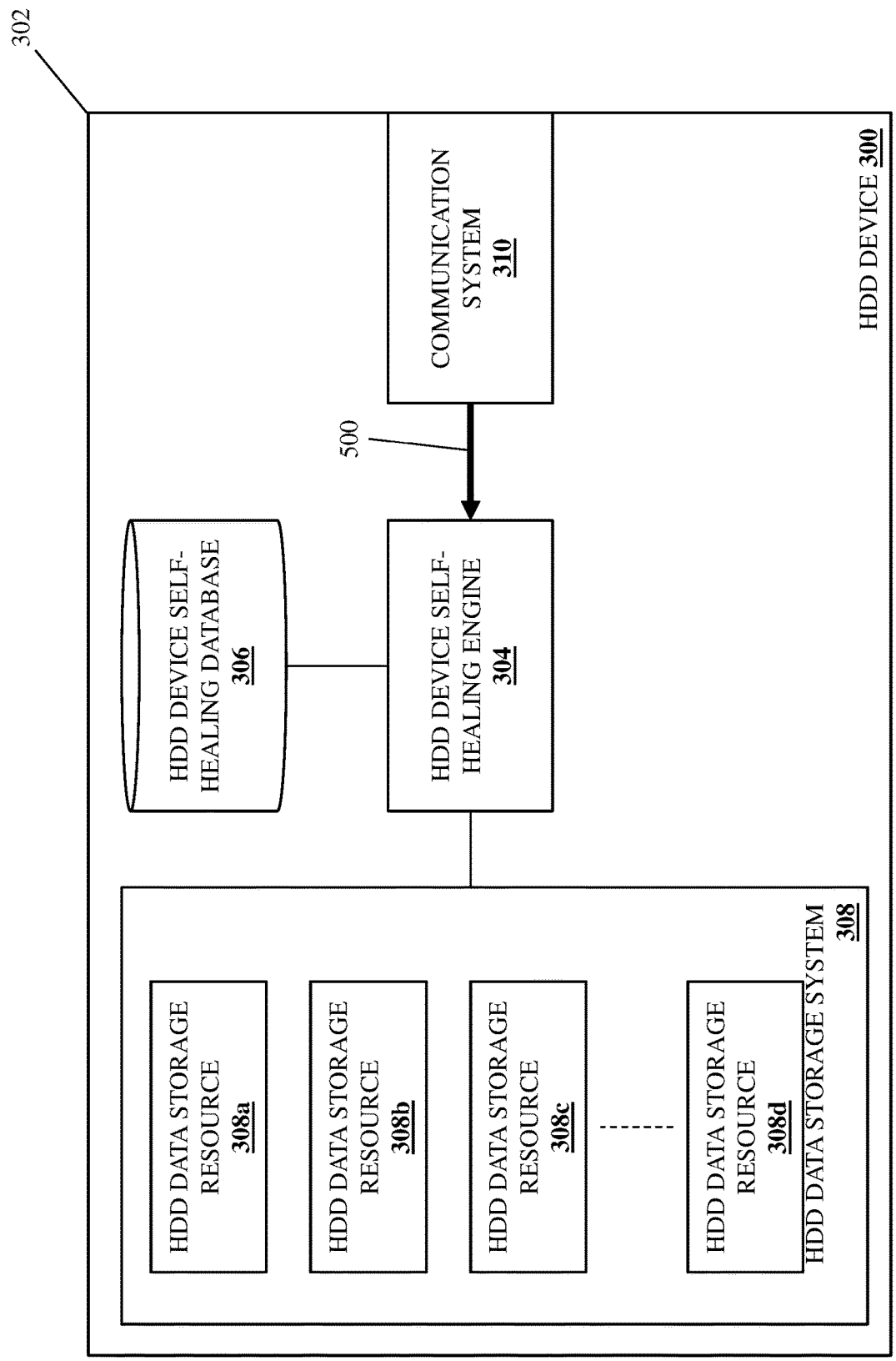
FIG. 5B is a schematic view illustrating an embodiment of the HDD device of FIG. 3 operating during the method of FIG. 4.

The method 400 begins at block 402 where an HDD device reserves one or more HDD data storage resources in an HDD data storage system. With reference to FIGS. 5A and 5B, in an embodiment of block 402, the host engine 204 in the computing device 200 may perform HDD data storage resource instruction operations 500 that may include providing an instruction to reserve one or more HDD data storage resources in one or more of the HDD devices 206/300 that may be received by the HDD device self-healing engine 304 in each of those HDD device(s) 206/300 via its communication system 310. As such, while the discussion below describes HDD data storage resource(s) in a single HDD device 300 being reserved and used in the self-healing HDD system of the present disclosure, one of skill in the art in possession of the present disclosure will appreciate how any number of HDD devices in a computing device may operate similarly to the HDD device 300 discussed below.

In some embodiments, the host engine 204 in the computing device 200 may perform the HDD data storage resource instruction operations 500 in response to a request from a user of the computing device 200. For example, during HDD device deployment (e.g., as part of the initial installation of the HDD device 206/300 in the computing device 200), the user of the computing device 200 may be given the option to reserve HDD data storage resource(s) in the HDD data storage system 308 of the HDD device 300, which one of skill in the art in possession of the present disclosure will appreciate allows that user to trade HDD storage capacity in the HDD device 300 for the increased reliability of the HDD device 300 as described below. In a specific example, the user of the computing device 200 may utilize a Command Line Interface (CLI) or Graphical User Interface (GUI) to identify a number of the HDD data storage resources 308a-308d in the HDD data storage system 308 of the HDD device 300 that should be reserved for use in the method 400 discussed below. Furthermore, one of skill in the art in possession of the present disclosure will appreciate how a user may choose to maximize the capacity of the HDD device 300 in such embodiments by not reserving any of the HDD data storage resources 308a-308d in the HDD data storage system 308 of the HDD device 300 for use in the method 400 discussed below, and in such cases the "self-healing" capabilities of the HDD device 300 will be unavailable and the method 400 may end.

To provide a specific example, the HDD data storage resources 308a-308d in the HDD device 300 may include 10 storage platters that each include 2 data storage surfaces, with 20 respective heads each having a read element and a write element provided for each of those data storage surfaces, and one of those data storage surfaces along with the read element and write element on the head provided for that data storage surface may be reserved at block 402 in order to reserve $1/20^{th}$ of the HDD storage capacity of the HDD device 300 and provide a reliability for the HDD device 300 that is similar to the reliability provided for using conventional storage device reliability techniques. However, while the reserving of a single HDD data storage resource that provides a particular amount of HDD storage capacity has been described and is used in the specific examples provided below, one of skill in the art in possession of the present disclosure will appreciate how the reserving of any amount of HDD storage capacity will fall within the scope of the present disclosure as well. For example, based on the relative importance of the data being stored, the conditions in which the computing device 200/HDD device 300 are being used (e.g., relatively harsh conditions that are associated with a higher probability of HDD data storage resource failure/unavailability), and/or other factors that would be apparent to one of skill in the art in possession of the present disclosure, half of the HDD storage capacity of the HDD device 300 may be reserved at block 402 (e.g., for relatively important data stored in the HDD device 300 in relatively harsh conditions) while remaining within the scope of the present disclosure as well.

Figure 5C:
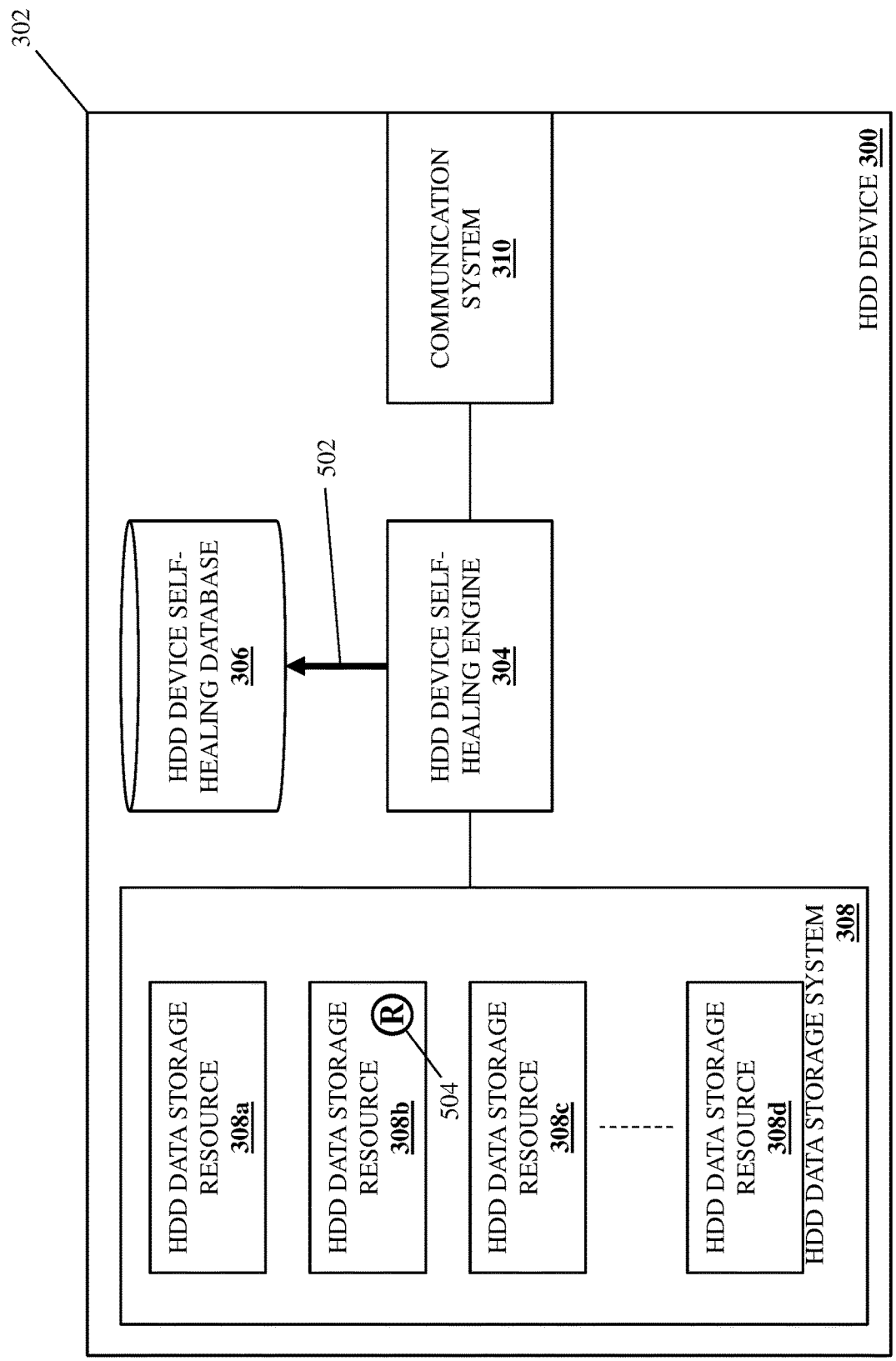
FIG. 5C is a schematic view illustrating an embodiment of the HDD device of FIG. 3 operating during the method of FIG. 4.

With reference to FIG. 5C, in an embodiment of block 402 and in response to receiving the instruction to reserve one of the HDD data storage resources 308a-308d in the HDD device 206/300, the HDD device self-healing engine 304 may perform HDD data storage resource reservation operations 502 that, in the embodiments illustrated and discussed below, include reserving the HDD data storage resource 308b in the HDD data storage system 308 (as indicated by the "®" element 504 on the HDD data storage resource 308b in FIG. 5C) by identifying in the HDD device self-healing database 306 that the HDD data storage resource 308b is reserved, and/or otherwise configuring the HDD data storage system 308 such that the HDD data storage resource 308b will not be used to store data that is provided to the HDD device 300 for storage (i.e., absent the need to perform the "self-healing" operations as described in further detail below). For example, the reserving of the HDD data storage resource 308b at block 402 may include maintaining a spare data storage surface that is not mapped to host-accessible LBA space, and/or any other HDD data storage resource reservation operations that one of skill in the art in possession of the present disclosure will appreciate will prevent the use of the HDD data storage resource 308b absent the need to perform the "self-healing" operations as described in further detail below.

As will be appreciated by one of skill in the art in possession of the present disclosure, the reserving of HDD data storage resource(s) in the HDD data storage system 308 may result in a relatively lower HDD storage capacity being reported for the HDD data storage system 308/HDD device 300 to the host engine 204 (e.g., relative to the HDD storage capacity of the HDD data storage system 308/HDD device 300 when none of its HDD data storage resources 308a-308d are reserved), but as described below that relatively lower HDD storage capacity of the HDD data storage system 308/HDD device 300 will remain constant in the event HDD data storage resources currently being used fail or otherwise become unavailable as long as there are reserved HDD data storage resource(s) in the HDD data storage system 308 to replace those failed or otherwise unavailable HDD data storage resource. However, while specific example of the reserving of HDD data storage resources in an HDD data storage system of an HDD device have been described, one of skill in the art in possession of the present disclosure will appreciate how HDD data storage resources in an HDD data storage system/HDD device may be reserved in a variety of manners that will fall within the scope of the present disclosure as well. For example, rather than requiring instruction from the host engine 204 and/or a user, the HDD data storage resource(s) in the HDD data storage system 308 of the HDD device 300 may be reserved by default, based on an amount of data that is currently stored in the HDD data storage system 308, and/or based on a variety of factors that would be apparent to one of skill in the art in possession of the present disclosure.

Figure 6B:
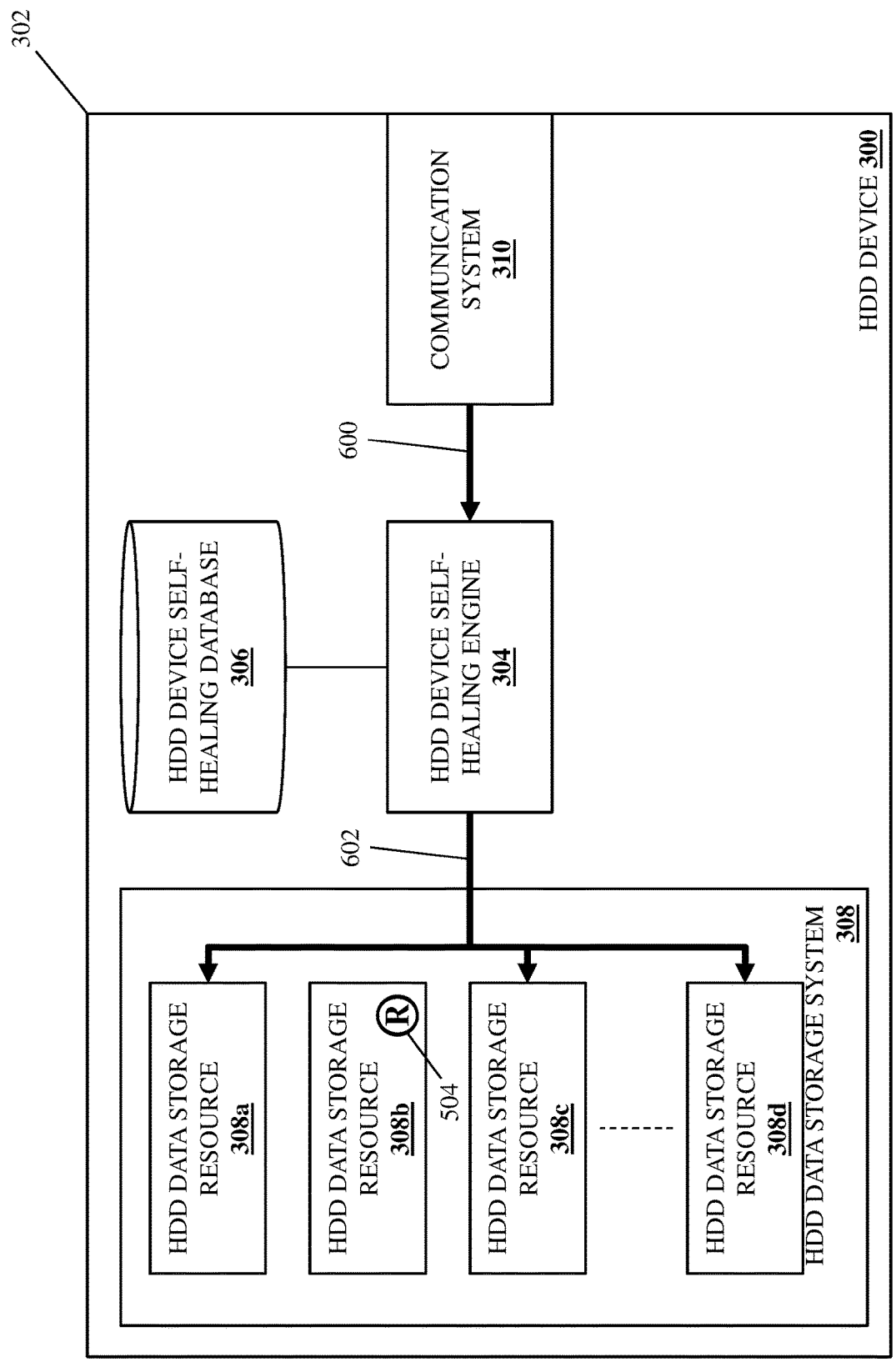
FIG. 6B is a schematic view illustrating an embodiment of the HDD device of FIG. 3 operating during the method of FIG. 4.

The method 400 then proceeds to block 404 where the HDD device prevents data from being stored in the reserved data storage resource(s) in the HDD data storage system. With reference to FIGS. 6A and 6B, in an embodiment of block 404, the host engine 600 may perform data storage operation instruction operations 600 that may include providing instructions to perform data storage operations to the HDD device 206/300 such that those instructions are received by the HDD device self-healing engine 304 via its communication system 310. As will be appreciated by one of skill in the art in possession of the present disclosure, the data storage operations instructed at block 404 may include data write instructions to write data to the HDD data storage system 308, data read instructions to read data from the HDD data storage system 308, data management instructions to manage data in the HDD data storage system 308, and/or any other data storage operations that one of skill in the art in possession of the present disclosure will appreciate as utilizing the HDD data storage system 308 for the storage and use of data.

With continued reference to FIG. 6B and in response to receiving the instructions to perform the data storage operations, the HDD device self-healing engine 304 in the HDD device 300 may perform data storage operations 602 that may include, for example, writing data to, reading data from, managing data on, and/or performing any other storage operations that would be apparent to one of skill in the art in possession of the present disclosure using the HDD data storage resources 308a, 308c, and up to 308d, while preventing the performance of the data storage operations 602 on the HDD data storage resource 308b. As discussed in some of the examples below, data write operations performed using the HDD data storage system 308 may include providing data redundancy for data written to the HDD data storage system 308 by, for example, utilizing RAID techniques (e.g., by writing primary data and parity data to the HDD data storage resources 308a-308d in the HDD data storage system 308) and/or data redundancy techniques known in the art. As discussed above, the reserving of the HDD data storage resource 308b at block 402 may include any of a variety of reservation operations that one of skill in the art in possession of the present disclosure will appreciate will prevent the use of the HDD data storage resource 308b to store data as described above for block 404 (i.e., absent the "self-healing" operations described in further detail below). As such, in a specific example, the data storage surface, its read element, and its write element provided by the HDD data storage resource 308b will not be utilized at block 404.

The method 400 then proceeds to decision block 406 where it is determined whether an HDD data storage resource that is being used in the HDD data storage system will be subsequently unavailable. In an embodiment, at decision block 406, the HDD device self-healing engine 304 in the HDD device 300 may determine whether any of the HDD data storage resources 308a, 308c, and up to 308d that are currently being used will be subsequently unavailable. In some embodiments, the determination of whether an HDD data storage resource that is currently being used will be subsequently unavailable may include a determination of whether that HDD data storage resource is currently unavailable (e.g., a determination of whether the data storage surface, read element, and/or write element provided by that HDD data storage resource is currently configured for use in storing data in the HDD data storage system 308 has failed or is otherwise currently unavailable). As such, the determination that an HDD data storage resource will subsequently be unavailable may be based on a determination that that HDD data storage resource is currently unavailable (i.e., due to an identification of the failure of that HDD data storage resource).

In other embodiments, the determination of whether an HDD data storage resource that is currently being used will be subsequently unavailable may include a prediction of whether that HDD data storage resource will subsequently be unavailable within a threshold time period (e.g., a prediction of whether the data storage surface, read element, and/or write element provided by that HDD data storage resource will fail or will otherwise subsequently become unavailable within a threshold time period). As such, one of skill in the art in possession of the present disclosure will appreciate how the HDD device self-healing engine 304 (or the host engine 204 in the computing device 200) may be configured to perform any of a variety of predictive failure/unavailability analysis operations on any of the HDD data storage resources 308a, 308c, and up to 308d in order to predict whether any of those HDD data storage resources will subsequently fail or otherwise subsequently become unavailable within some threshold time period. However, while a few specific techniques have been described, one of skill in the art in possession of the present disclosure will appreciate how the subsequently unavailability of the HDD data storage resources 308a, 308c, and up to 308d in the HDD data storage system 308 may be determined in a variety of manners that will fall within the scope of the present disclosure as well.

If, at decision block 406, it is determined that no HDD data storage resource that is being used in the HDD data storage system will be subsequently unavailable, the method 400 returns to block 404. As such, in the event the HDD device self-healing engine 304 in the HDD device 300 determines that none of the HDD data storage resources 308a, 308c, and up to 308d will be subsequently unavailable (e.g., no data storage surface, read element, and/or write element provided by any of the HDD data storage resources 308a, 308c, and up to 308d has failed or is otherwise currently unavailable, or is predicted to fail or otherwise become unavailable within a threshold time period), the method 400 may loop such that the HDD device 300 continues to prevent data from being stored on the reserved HDD data storage resource 308*b* in the HDD data storage system 300 while performing the data storage operations discussed above using the HDD data storage resources 308*a*, 308*c*, and up to 308*d* in the HDD data storage system 308, as long as it is determined that none of those HDD data storage resources 308*a*, 308*c*, and up to 308*d* will become subsequently unavailable.

If, at decision block 406, it is determined that an HDD data storage resource that is being used in the HDD data storage system will be subsequently unavailable, the method 400 proceeds to decision block 408 where the method 400 proceeds depending on whether a predicted unavailability or a current write element unavailability has been detected. As will be appreciated by one of skill in the art in possession of the present disclosure and as discussed in further detail below, the operations performed such that the reserved HDD data storage resource may be utilized in place of the unavailable HDD data storage resource will differ depending on whether data may be read from that unavailable HDD data storage resource, and thus predicted unavailability of HDD data storage resources or currently unavailable write elements provided by HDD data storage resources that do not prevent the reading of data from those HDD data storage resources will result in different operations being performed relative to when there are currently unavailable read elements provided by HDD data storage resources that prevent the reading of data from those HDD data storage resources.

Figure 7:
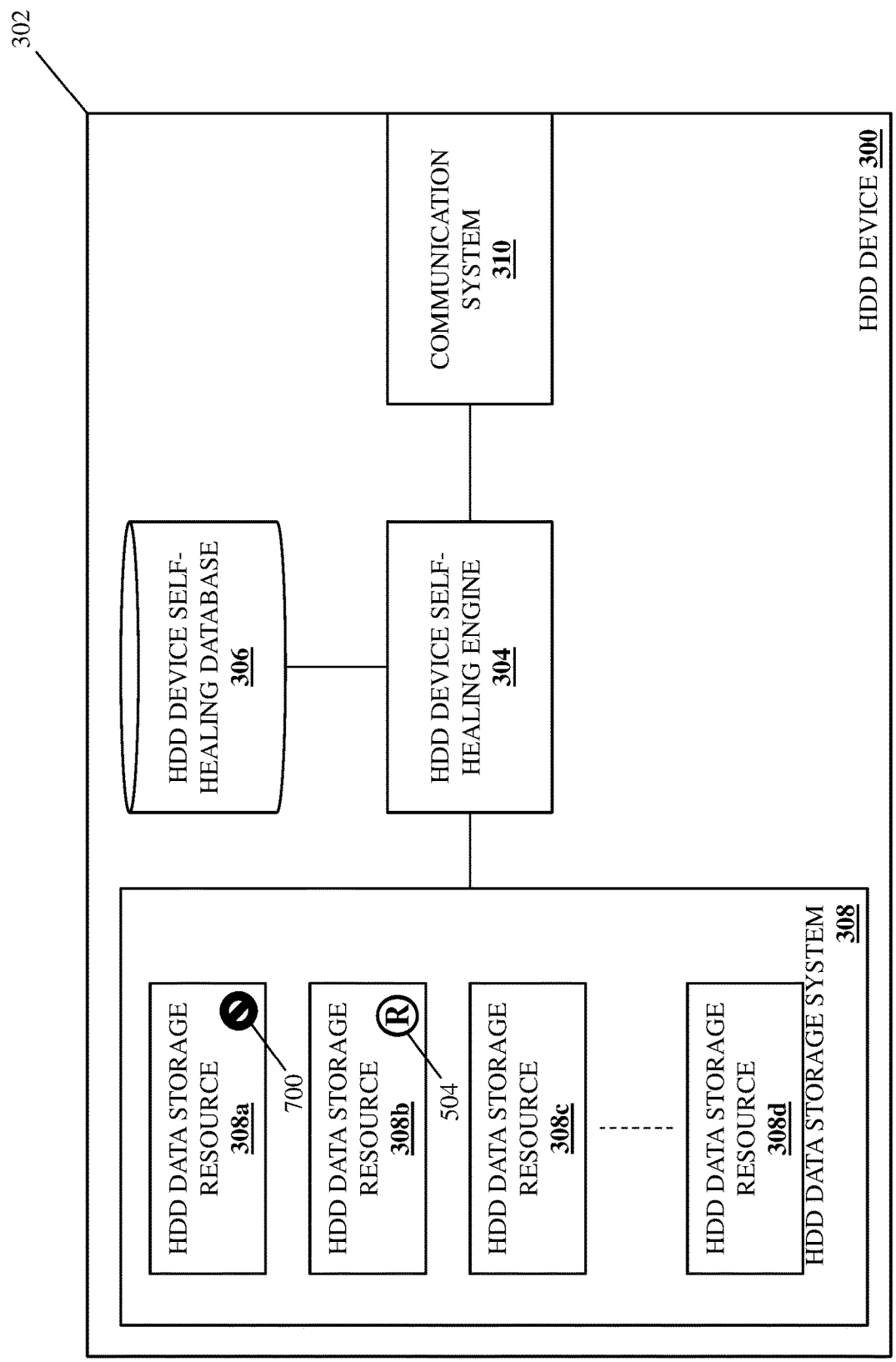
FIG. 7 is a schematic view illustrating an embodiment of the HDD device of FIG. 3 operating during the method of FIG. 4.

If, at decision block 408, a predicted unavailability or a current write element unavailability has been detected, the method 400 proceeds to block 410 where the HDD device remaps logical addresses associated with the HDD data storage resource that will be subsequently unavailable to a reserved HDD data storage resource. With reference to FIG. 7, in an embodiment of decision block 408, the HDD device self-healing engine 304 in the HDD device 300 may determine that the HDD data storage resource 308*a* will be subsequently unavailable (e.g., by determining that the data storage surface, read element, and/or write element provided by the HDD data storage resource 308*a* has failed or is otherwise currently unavailable, or is predicted to fail or become unavailable within a threshold time period, as indicated by element 700 on the HDD data storage resource 308*a* in FIG. 7). However, while the HDD device 300 is described as determining the subsequent unavailability of an HDD data storage resource, one of skill in the art in possession of the present disclosure will appreciate how the host engine 204 may determine the subsequent unavailability of an HDD data storage resource and may then cause the HDD device to perform the logical address remapping discussed below while remaining within the scope of the present disclosure as well.

Figure 8:
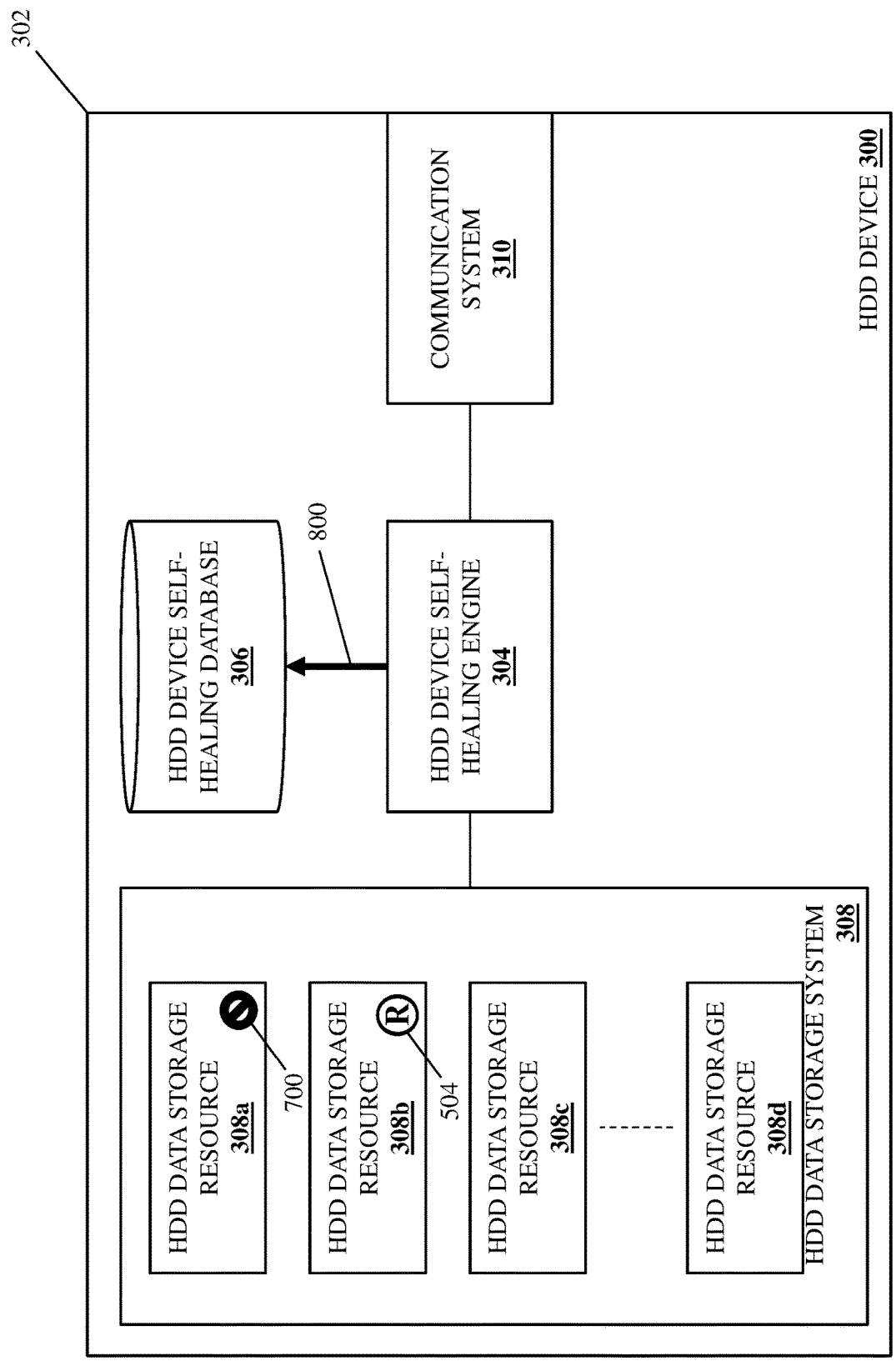
FIG. 8 is a schematic view illustrating an embodiment of the HDD device of FIG. 3 operating during the method of FIG. 4.

With reference to FIG. 8, in an embodiment of block 410 and in response to determining that the HDD data storage resource 308*a* will be subsequently unavailable, the HDD device self-healing engine 304 in the HDD device 300 may perform logical address remapping operations 800 that may include remapping logical addresses associated with the HDD data storage resource 308*a* in the HDD device self-healing database 306 to the HDD data storage resource 308*b* that was reserved at block 402. For example, at block 410 the HDD device self-healing engine 304 may remap any Logical Block Addresses (LBAs) that are mapped to physical storage locations included on the data storage surface provided by the HDD data storage resource 308*a* to physical storage locations included on the data storage surface provided by the HDD data storage resource 308*b*, as well as perform any other remapping operations that would be apparent to one of skill in the art in possession of the present disclosure.

As such, in a simplified example, if the physical storage locations included on the data storage surface provided by the HDD data storage resource 308*a* are mapped to LBAs 0-10, the physical storage locations included on the data storage surface provided by the HDD data storage resource 308*c* are mapped to LBAs 11-20, and so on up to the last 10 LBAs that are mapped to the HDD data storage resource 308*d*, the logical address remapping operations 800 at the block 408 may remap the LBAs 0-10 to the physical storage locations included on the data storage surface provided by the HDD data storage resource 308*b* such that LBAs 0-10, 11-20, and up to the last 10 LBAs may still be used to access the physical storage locations included on the data storage surfaces provided by the HDD data storage resources 308*b*, 308*c*, and up to 308*d* in subsequent data storage operations. However, while a specific example of logical address remapping operations have been described, one of skill in the art in possession of the present disclosure will appreciate how reserved HDD data storage resources like the HDD data storage resource 308*b* may be configured for use in place of unavailable HDD data storage resources like the HDD data storage resource 308*a* using a variety of techniques that will fall within the scope of the present disclosure as well.

Figure 9:
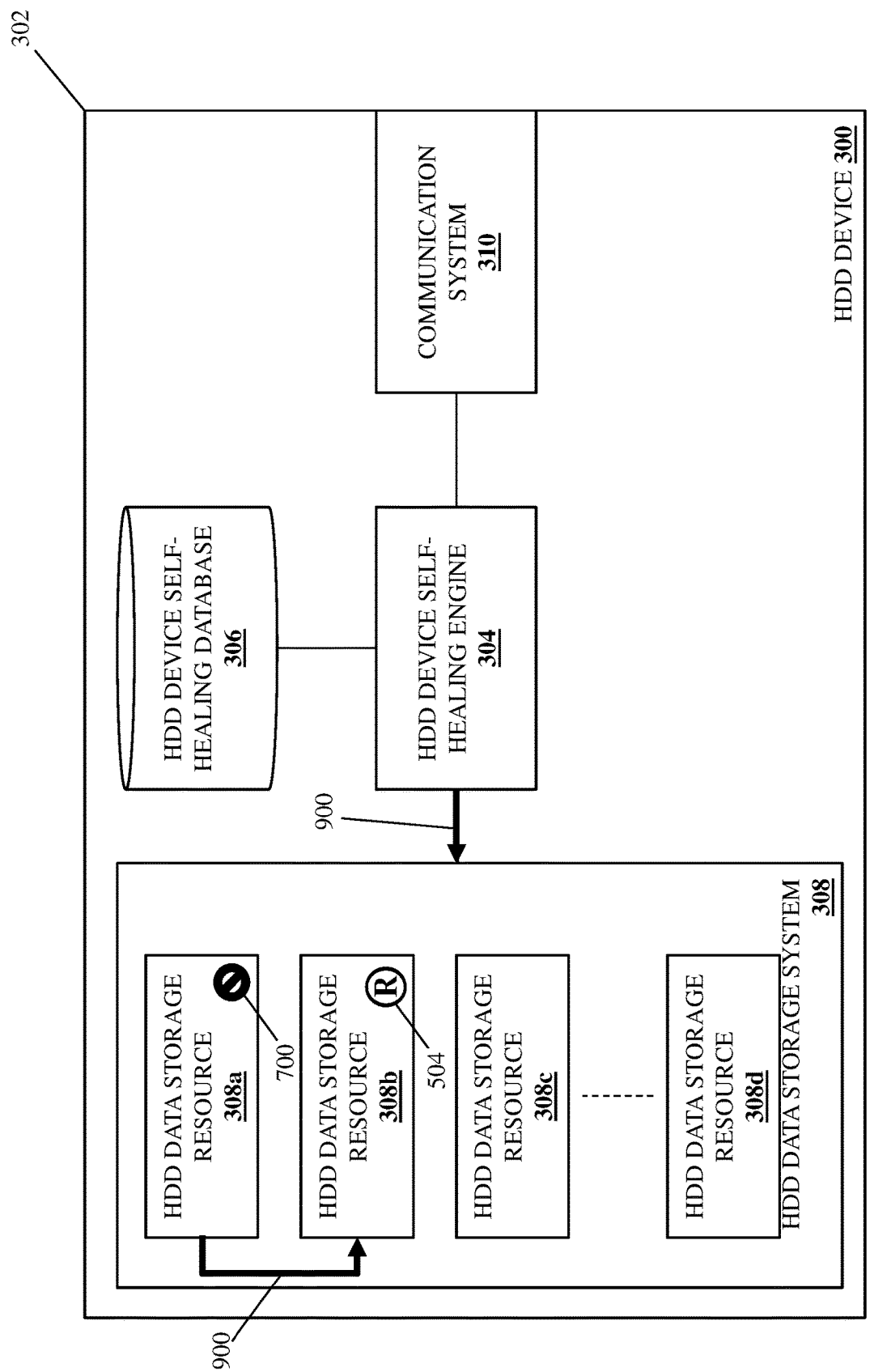
FIG. 9 is a schematic view illustrating an embodiment of the HDD device of FIG. 3 operating during the method of FIG. 4.

The method 400 then proceeds to block 412 where the HDD device copies data associated with the HDD data storage resource that will be subsequently unavailable to the reserved HDD data storage resource. With reference to FIG. 9, at block 412 and in embodiments in which the predicted unavailability of the HDD data storage resource 308*a* or the currently unavailable write element provided by the HDD data storage resource 308*a* has been detected that does not prevent the reading of data from that HDD data storage resource 308*a*, the HDD device self-healing engine 304 may perform data copying operations 900 that may include reading the data stored on data storage surface provided by the HDD data storage resource 308*a* (e.g., using the currently available read element provided by the HDD data storage resource 308*a*), and writing that data to the data storage surface provided by the HDD data storage resource 308*b*. As will be appreciated by one of skill in the art in possession of the present disclosure, the data copying operations 900 may be performed "in the background" such that, for example, the host engine 204 and/or software stacks running in the computing device 200 are not aware of those data copying operations 900.

In an embodiment, as part of the data copying operations 900, the HDD device self-healing engine 304 in the HDD device 300 may track the data that is being copied from the data storage surface provided by the HDD data storage resource 308*a* to the data storage surface provided by the HDD data storage resource 308*b* such that, if a request to perform a storage operation is received that is associated with the logical addresses that were remapped from the data storage surface provided by the HDD data storage resource 308*a* to the data storage surface provided by the HDD data storage resource 308*b*, that storage operation may be performed based on that data tracking. For example, at block 412, the HDD device self-healing engine 304 may generate and use a bitmap or other data tracking structure to track which LBAs have had their data copied from the data storage surface provided by the HDD data storage resource 308*a* to the data storage surface provided by the HDD data storage resource 308*b*. As will be appreciated by one of skill in the art in possession of the present disclosure, the size of the bitmap or other data tracking structure may be reduced by, for example, mapping subregions of the data storage surfaces that are provided by the HDD data storage resources and that include tens of thousands LBAs (i.e., rather than mapping individual LBAs) as described in some of the specific examples provided below.

As such, the bitmap or other data tracking structure may be updated during the data copying operations 900 to identify (e.g., in real-time) which LBAs have their data still remaining on the data storage surface provided by the HDD data storage resource 308a, and which LBAs have had their data copied to the data storage surface provided by the HDD data storage resource 308b, and the HDD device self-healing engine 304 in the HDD device 300 may utilize storage operation performance rules based on the bitmap or other data tracking structure to prevent data integrity issues and/or other issues associated with the performance of data storage operations on the LBAs that are having their associated data copied from the data storage surface provided by the HDD data storage resource 308a to the data storage surface provided by the HDD data storage resource 308b.

In an embodiment, the bitmap or other data tracking structure may be used to identify the state of the data associated with the LBAs with regard to the data copying operations 900, and the storage operation performance rules may define how data read operations and data write operations (e.g., which may be received from the host engine 204 during the data copying operations 900) are performed based on that state of the data associated with the LBAs with regard to the data copying operations 900. In a specific example, if the bitmap or other data tracking structure indicates that data copying operations 900 for a subregion of the data storage surface provided by the HDD data storage resource 308b is complete (e.g., the LBAs remapped to that subregion have had their data copied from the data storage surface provided by the HDD data storage resource 308a to the data storage surface provided by the HDD data storage resource 308b in this example), then the storage operation performance rules may cause the HDD device self-healing engine 304 to perform data read operations associated with those LBAs by reading the data stored on that subregion of the data storage surface provided by the HDD data storage resource 308b, and to perform data write operations associated with those LBAs by writing data to that subregion of the data storage surface provided by the HDD data storage resource 308b.

In another specific example, if the bitmap or other data tracking structure indicates that data copying operations 900 for a subregion of the data storage surface provided by the HDD data storage resource 308b is in-progress (e.g., the LBAs remapped to that subregion are currently having their data copied from the data storage surface provided by the HDD data storage resource 308a to the data storage surface provided by the HDD data storage resource 308b such that some of those LBAs may have their data copied to the data storage surface provided by the HDD data storage resource 308b, while the data for some of those LBAs remains on the data storage surface provided by the HDD data storage resource 308a in this example), then the storage operation performance rules may cause the HDD device self-healing engine 304 to perform data read operations associated with those LBAs by reading the data stored on a corresponding subregion of the data storage surface provided by the HDD data storage resource 308a, and may cause the HDD device self-healing engine 304 to wait to perform data write operations associated with those LBAs until the data copying operations 900 for the subregion of the data storage surface provided by the HDD data storage resource 308b is completed (at which time those data write operations may be performed by writing data to that subregion of the data storage surface provided by the HDD data storage resource 308b).

In another specific example, if the bitmap or other data tracking structure indicates that data copying operations 900 for a subregion of the data storage surface provided by the HDD data storage resource 308b is pending (e.g., the LBAs remapped to that subregion are scheduled to have their data copied from the data storage surface provided by the HDD data storage resource 308a to the data storage surface provided by the HDD data storage resource 308b during some subsequent time period in this example), then the storage operation performance rules may cause the HDD device self-healing engine 304 to perform data read operations associated with those LBAs by reading the data stored on a corresponding subregion of the data storage surface provided by the HDD data storage resource 308a, and may cause the HDD device self-healing engine 304 to force data copying operations 900 for the subregion of the data storage surface provided by the HDD data storage resource 308b when a request to perform a data write operation is received (with those data write operations then performed by writing data to that subregion of the data storage surface provided by the HDD data storage resource 308b once those data copying operations 900 have been completed).

As will be appreciated by one of skill in the art in possession of the present disclosure, following the completion of the data copying operations 900, the HDD data storage system 308 in the HDD device 300 will have the same data storage capacity as prior to the unavailability of the HDD data storage resource 308a, with all the data that was previously stored in the HDD data storage resource 308a now available in the HDD data storage resource 308b via the same LBAs. Furthermore, once the HDD device self-healing engine 304 has completed the data copying operations 900, the bitmap or other data tracking structure used to track the data copying operations 900 as discussed above may be retired, erased, deleted, or otherwise discarded, and the method 400 may then return to block 404. As such, the method 400 may loop such that, in the event of predicted unavailability of an HDD data storage resource or a current unavailability of a write element provided by an HDD data storage resource, the HDD device copies data from that HDD data storage resource to a reserved HDD data storage resource (e.g., as long as reserved HDD data storage resources are available in the HDD data storage system 308).

While not described herein in detail, one of skill in the art in possession of the present disclosure will appreciate how the data copying operations 900 may fail in some situations (e.g., due to a defective read element, a data storage surface defect, and/or other issues that would be apparent to one of skill in the art in possession of the present disclosure). In the event of such a data copying operation failure, the HDD device self-healing engine 304 may provide a request to the host engine 204 to perform the data copying operations, may attempt to rebuild the data (which is currently stored on the HDD data storage resource 308a) on the HDD data storage resource 308b similarly as discussed below, and/or may attempt to have the host engine 204 rebuild the data (which is currently stored on the HDD data storage resource 308a) on the HDD data storage resource 308b similarly as discussed below. Furthermore, in the event the data stored on the HDD data storage resource 308a cannot be provided (e.g., copied or rebuilt) on the HDD data storage resource

308*b*, the HDD device 300 may be marked as a failed/unavailable HDD device, may be configured as a read-only HDD device, and/or may be subject to other HDD data unavailability categorizations and/or configurations that would be apparent to one of skill in the art in possession of the present disclosure.

If, at decision block 408, it is determined that a predicted unavailability or a current write element unavailability has not been detected, then a read element unavailability has been detected and the method 400 proceeds to decision block 414 where the method 400 may proceed depending on whether the HDD device is configured to perform a data rebuild. As discussed below, some embodiments of the present disclosure, the HDD device self-healing engine 304 in the HDD device 300 may be configured to perform data rebuild operations to rebuild data, which was previously stored on a data storage surface provided by an HDD data storage resource in the HDD data storage system 308 but is unavailable due to the unavailability of that HDD data storage resource, on a reserved HDD data storage resource. However, in other embodiments, the HDD device self-healing engine 304 in the HDD device 300 may not be configured to perform such data rebuild operations, and may attempt to have the host engine 204 perform such data rebuild operations. One of skill in the art in possession of the present disclosure will appreciate how the examples below described such data rebuild operations as being performed using Redundant Array of Independent Disk (RAID) techniques, but will recognize how any of a variety of data rebuild techniques will fall within the scope of the present disclosure as well.

If, at decision block 414, the HDD device is configured to perform a data rebuild, the method 400 proceeds to block 415 where the HDD device remaps logical addresses associated with the HDD data storage resource that will be subsequently unavailable to a reserved HDD data storage resource. As will be appreciated by one of skill in the art in possession of the present disclosure, the logical address remapping performed at block 415 may be performed substantially similarly to the logical address remapping described above with reference to block 410.

Figure 10:
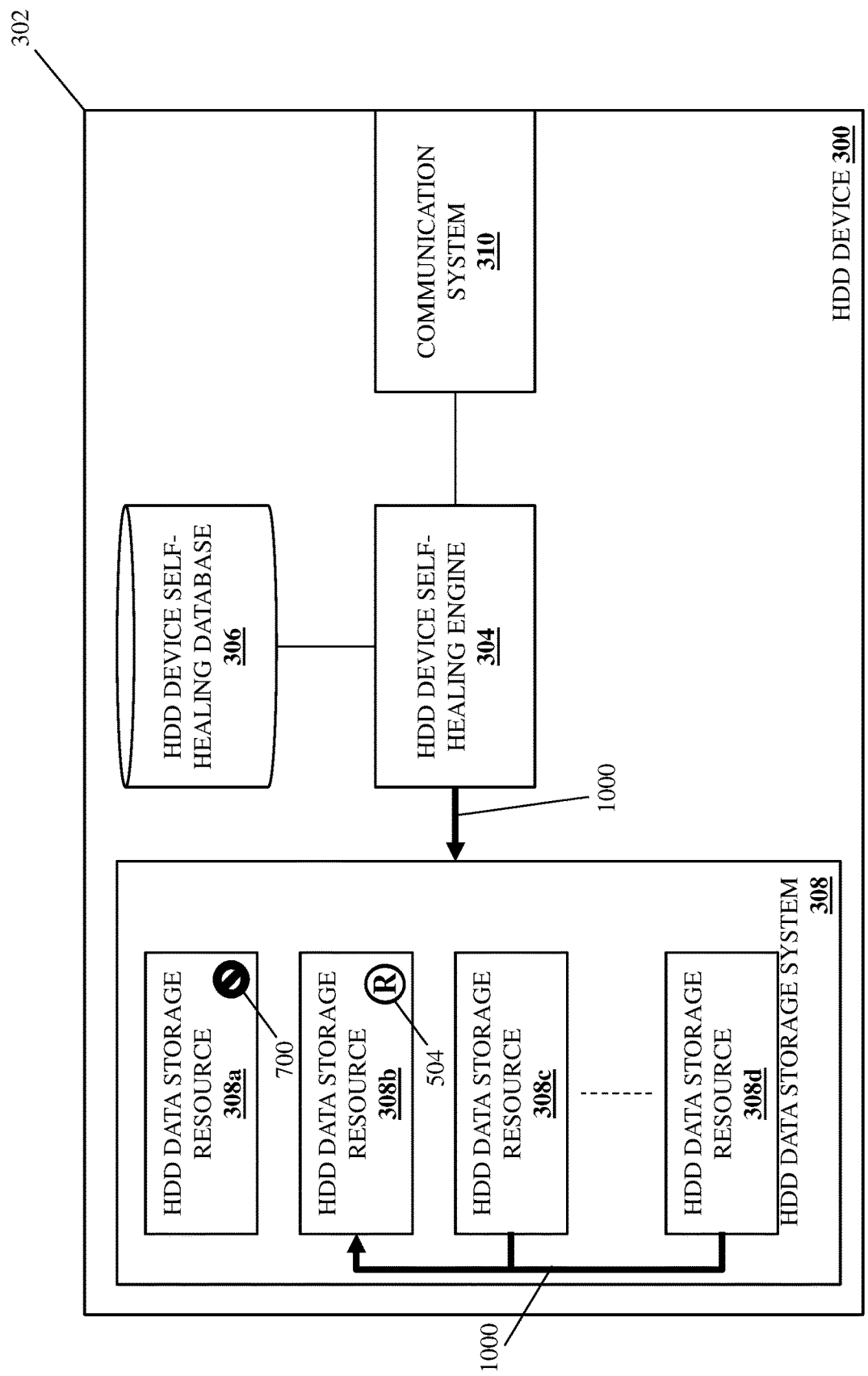
FIG. 10 is a schematic view illustrating an embodiment of the HDD device of FIG. 3 operating during the method of FIG. 4.

The method 400 then proceeds to block 416 where the HDD device rebuilds data associated with the HDD data storage resource that will be subsequently unavailable to generate rebuilt data, and then to block 418 where the HDD device provides the rebuilt data on the reserved data storage resource. As will be appreciated by one of skill in the art in possession of the present disclosure, the HDD device data rebuild operations performed at block 416 of the method 400 may benefit from providing the HDD device 300 as an SMR HDD device, as writes to an SMR HDD device are performed in a large, sequential format that allows the data to span multiple heads, as well as for the generation of parity data "on-the-fly". With reference to FIG. 10, at blocks 416 and 418 and in embodiments in which the currently unavailable read element provided by the HDD data storage resource 308*a* has been detected that prevents the reading of data from that HDD data storage resource 308*a*, the HDD device self-healing engine 304 may perform data rebuild operations 1000 that may include using the data stored on data storage surfaces provided by the HDD data storage resources 308*c* and up to 308*d* (e.g., "primary" data and "parity data") to rebuild the data that was stored on the data storage surface provided by the HDD data storage resource 308*a* to generate rebuilt data (e.g., using RAID techniques), and writing that rebuilt data to the data storage surface provided by the HDD data storage resource 308*b*. As will be appreciated by one of skill in the art in possession of the present disclosure, the data rebuild operations 1000 may be performed "in the background" such that, for example, the host engine 204 and/or software stacks running in the computing device 200 are not aware of those data rebuild operations 1000.

Similarly as described above, as part of the data rebuild operations 1000, the HDD device self-healing engine 304 in the HDD device 300 may track the data that is being rebuilt and written to the data storage surface provided by the HDD data storage resource 308*b* such that, if a request to perform a storage operation is received that is associated with the logical addresses that were remapped from the data storage surface provided by the HDD data storage resource 308*a* to the data storage surface provided by the HDD data storage resource 308*b*, that storage operation may be performed based on that data tracking. For example, at block 414, the HDD device self-healing engine 304 may generate and use a bitmap or other data tracking structure to track which LBAs have had their data rebuilt and written to the data storage surface provided by the HDD data storage resource 308*b*. As also discussed above, the size of the bitmap or other data tracking structure may be reduced by, for example, mapping subregions of the data storage surfaces that are provided by the HDD data storage resources and that include tens of thousands LBAs (rather than mapping individual LBAs) as described in some of the specific examples provided below.

As such, the bitmap or other data tracking structure may be updated during the data rebuild operations 1000 to identify (e.g., in real-time) which LBAs have not had their data rebuilt and written to the data storage surface provided by the HDD data storage resource 308*b*, and which LBAs have had their data rebuilt and written to the data storage surface provided by the HDD data storage resource 308*b*, and the HDD device self-healing engine 304 in the HDD device 300 may utilize storage operation performance rules based on the bitmap or other data tracking structure to prevent data integrity issues and/or other issues associated with the performance of data storage operations on the LBAs that are having their associated data rebuilt and written to the data storage surface provided by the HDD data storage resource 308*b*.

Similarly as discussed above, the bitmap or other data tracking structure may be used to identify the state of the data associated with the LBAs with regard to the data rebuild operations 1000, and the storage operation performance rules may define how data read operations and data write operations (e.g., which may be received from the host engine 204 during the data rebuild operations 1000) are performed based on that state of the data associated with the LBAs with regard to the data rebuild operations 1000. In a specific example, if the bitmap or other data tracking structure indicates that data rebuild operations 1000 for a subregion of the data storage surface provided by the HDD data storage resource 308*b* is complete (e.g., the LBAs remapped to that subregion have had their data rebuilt and written to the data storage surface provided by the HDD data storage resource 308*b* in this example), then the storage operation performance rules may cause the HDD device self-healing engine 304 to perform data read operations associated with those LBAs by reading the data stored on that subregion of the data storage surface provided by the HDD data storage resource 308*b*, and to perform data write operations associated with those LBAs by writing data to that subregion of the data storage surface provided by the HDD data storage resource 308*b*.

In another specific example, if the bitmap or other data tracking structure indicates that data rebuild operations 1000 for a subregion of the data storage surface provided by the HDD data storage resource 308b is in-progress (e.g., the LBAs remapped to that subregion are currently having their data rebuilt and written to the data storage surface provided by the HDD data storage resource 308b such that some of those LBAs may have their data rebuilt and written to the data storage surface provided by the HDD data storage resource 308b, while the data for some of those LBAs may not yet have been rebuilt or written to the HDD data storage resource 308b in this example), then the storage operation performance rules may cause the HDD device self-healing engine 304 to wait to perform data read operations and data write operations associated with those LBAs until the data rebuild operations 1000 for the subregion of the data storage surface provided by the HDD data storage resource 308b is completed (at which time those data read operations and data write operations may be performed by reading data from and writing data to that subregion of the data storage surface provided by the HDD data storage resource 308b).

In another specific example, if the bitmap or other data tracking structure indicates that data rebuild operations 1000 for a subregion of the data storage surface provided by the HDD data storage resource 308b is pending (e.g., the LBAs remapped to that subregion are scheduled to have their data rebuilt and written to the data storage surface provided by the HDD data storage resource 308a during some subsequent time period in this example), then the storage operation performance rules may cause the HDD device self-healing engine 304 to force data rebuild operations 1000 for the subregion of the data storage surface provided by the HDD data storage resource 308b when a request to perform a data read operation or a data write operation is received (with those data read operations or data write operations then performed by reading data from or writing data to that subregion of the data storage surface provided by the HDD data storage resource 308b once those data rebuild operations 1000 have been completed).

As will be appreciated by one of skill in the art in possession of the present disclosure, following the completion of the data rebuild operations 1000, the HDD data storage system 308 in the HDD device 300 will have the same data storage capacity as prior to the unavailability of the HDD data storage resource 308a, with all the data that was previously stored in the HDD data storage resource 308a now available in the HDD data storage resource 308b via the same LBAs. Furthermore, once the HDD device self-healing engine 304 has completed the data rebuild operations 1000, the bitmap or other data tracking structure used to track the data rebuild operations 1000 as discussed above may be retired, erased, deleted, or otherwise discarded, and the method 400 may then return to block 404. As such, the method 400 may loop such that, in the event of a current unavailability of a read element provided by an HDD data storage resource and in situations in which the HDD device is configured to perform data rebuild, the HDD device rebuilds data currently stored on that unavailable HDD data storage resource to generate rebuilt data, and writes that rebuilt data to a reserved HDD data storage resource (e.g., as long as reserved HDD data storage resources are available in the HDD data storage system 308).

While not described herein in detail, one of skill in the art in possession of the present disclosure will appreciate how the data rebuild operations 1000 may fail in some situations. In the event of such a data rebuild operation failure, the HDD device self-healing engine 304 may provide a request to the host engine 204 to rebuild the data (which is currently stored on the HDD data storage resource 308a) on the HDD data storage resource 308b similarly as discussed below. Furthermore, in the event the data stored on the HDD data storage resource 308a cannot be rebuilt on the HDD data storage resource 308b, the HDD device 300 may be marked as a failed/unavailable HDD device and/or may be subject to other HDD data unavailability categorizations and/or configurations that would be apparent to one of skill in the art in possession of the present disclosure.

Figure 11A:
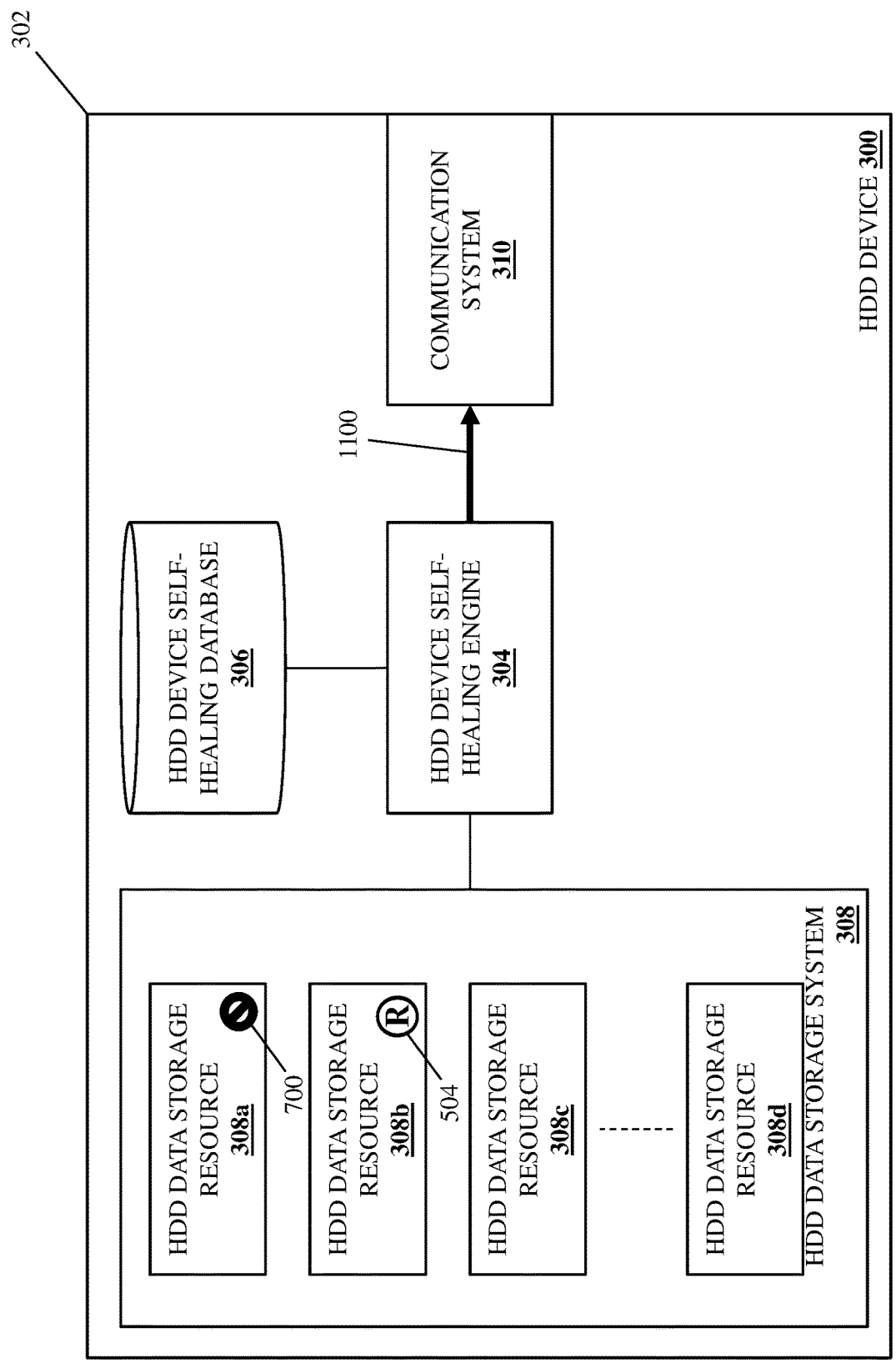
FIG. 11A is a schematic view illustrating an embodiment of the HDD device of FIG. 3 operating during the method of FIG. 4.

If, at decision block 414, the HDD device is not configured to perform a data rebuild, the method 400 proceeds to decision block 419 where the method 400 proceeds depending on whether the host engine 204 is configured to perform a data rebuild. With reference to FIGS. 11A and 11B, in an embodiment of decision block 419, the HDD device self-healing engine 304 in the HDD device 300 may perform host data rebuild request operations 1100 that may include transmitting a request via its communication system 310 and to the host engine 204 to rebuild the data, which was stored on the HDD data storage resource 308a, on the HDD data storage resource 308b. In response to the host engine 204 receiving the request to rebuild the data, the method 400 may proceed depending on whether the host engine 204 is configured to perform a data rebuild.

If, at decision block 419, the host is not configured to perform a data rebuild, the method 400 may proceed to block 420 where the host attempts other data recovery operations. For example, in the event the host engine 204 is not configured to perform RAID data rebuild operations, the host engine 204 may attempt other data recovery techniques to recover data from the HDD data storage resource 308a and provide that recovered data to the HDD device self-healing engine 304 in the HDD device 300 for writing to the HDD data storage resource 308b. As will be appreciated by one of skill in the art in possession of the present disclosure, if the read element in the HDD data storage resource 308a is completely unavailable, the data stored on the data storage surface in the HDD data storage resource 308a may be unavailable as well. However, if only portions of the data storage surface in the HDD data storage resource 308a are unavailable, the host engine 204a may attempt to recover the data from the portions of the data storage surface in the HDD data storage resource 308a that are available, and may then subsequently provide that recovered data to the HDD device self-healing engine 304 in the HDD device 300 once it has synchronized the provisioning of the recovered data with the HDD device self-healing engine 304, allowing the HDD device self-healing engine 304 to write that recovered data to the HDD data storage resource 308b.

To provide a specific example of such data recovery operations, the HDD device self-healing engine 304 in the HDD device 300 may provide a list of LBAs that map to the data storage surface in the HDD data storage resource 308a that is unavailable (but without yet having performed the logical address remapping operations described above). The host engine 204 may then use that list of LBAs to perform read operations and read retry operations in order to attempt to read at least a portion of the data from the data storage surface in the HDD data storage resource 308a that is unavailable, with the host engine 204 tracking which LBAs are associated with successful reads and which LBAs are associated with failed reads, and storing any "recovered data" (e.g., recovered via a successful read) in an intermediate storage location that is accessible to the host engine 204. After the storage of the recovered data, the host engine 204 may instruct the HDD device self-healing engine 304 in the HDD device 300 to perform the logical address remapping operations to remap the LBAs from the data storage surface in the HDD data storage resource 308a to the data storage surface in the HDD data storage resource 308b. Following the logical address remapping operations, the host engine 204 may write the recovered data stored in the intermediate storage location to the data storage surface in the HDD data storage resource 308b, while tracking the LBAs associated with "unrecovered data" that could not be read from the data storage surface in the HDD data storage resource 308a so that it may report that unrecovered data as unavailable if requested. However, while a particular non-data-rebuild data recovery operation has been described, one of skill in the art in possession of the present disclosure will appreciate how other non-data-rebuild data recovery operations will fall within the scope of the present disclosure as well.

Following block 420, the method 400 returns to block 404. As such, the method 400 may loop such that, in the event of a current unavailability of a read element provided by an HDD data storage resource and in situations in which the HDD device and the host are not configured to perform data rebuild, the host attempts other data recovery operations on data currently stored on that unavailable HDD data storage resource, and, if successful, provides that recovered data to the HDD device so that the HDD device may write that recovered data to a reserved HDD data storage resource (e.g., as long as reserved HDD data storage resources are available in the HDD data storage system 308).

Figure 12A:
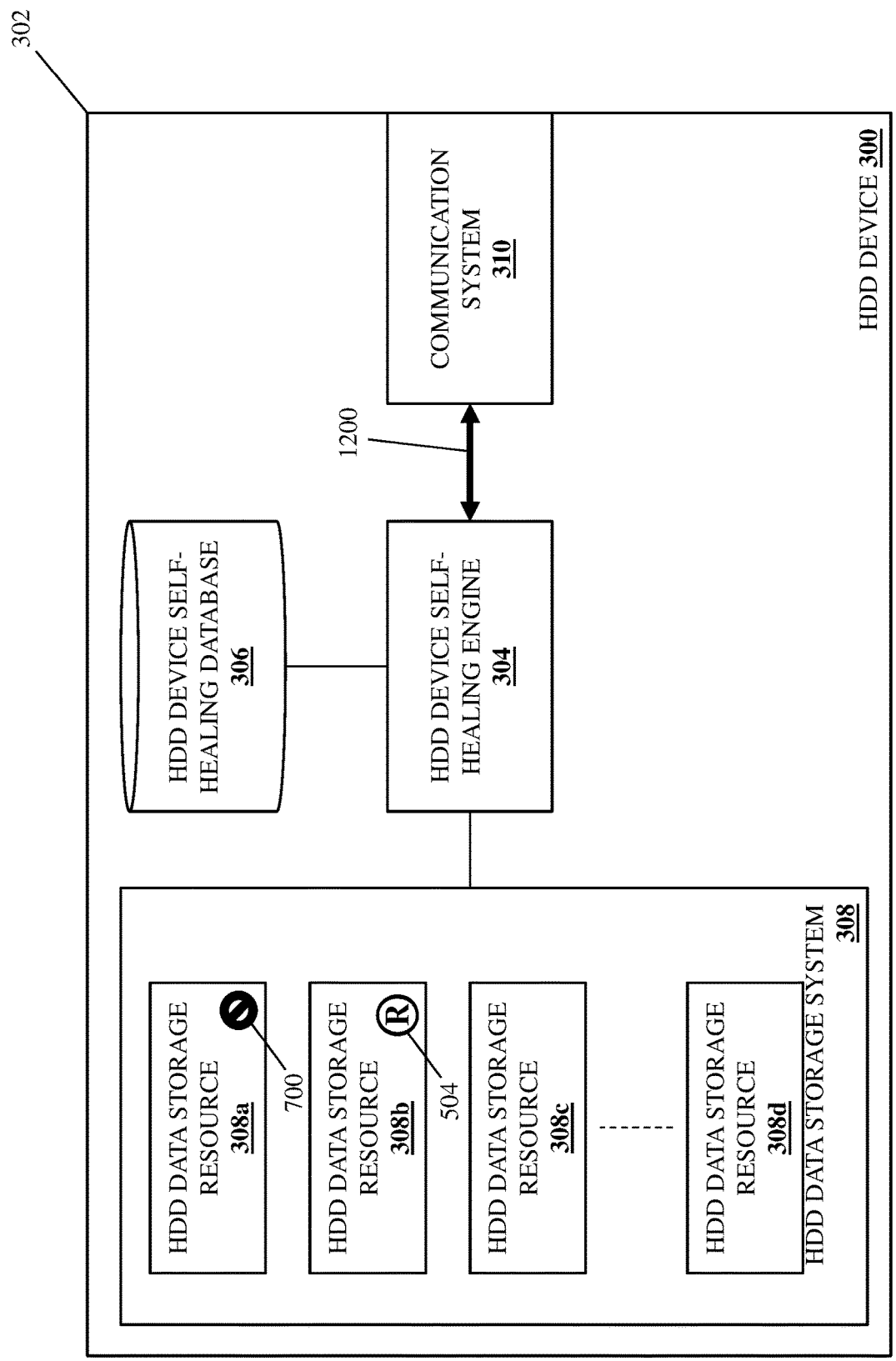
FIG. 12A is a schematic view illustrating an embodiment of the HDD device of FIG. 3 operating during the method of FIG. 4.
Figure 12B:
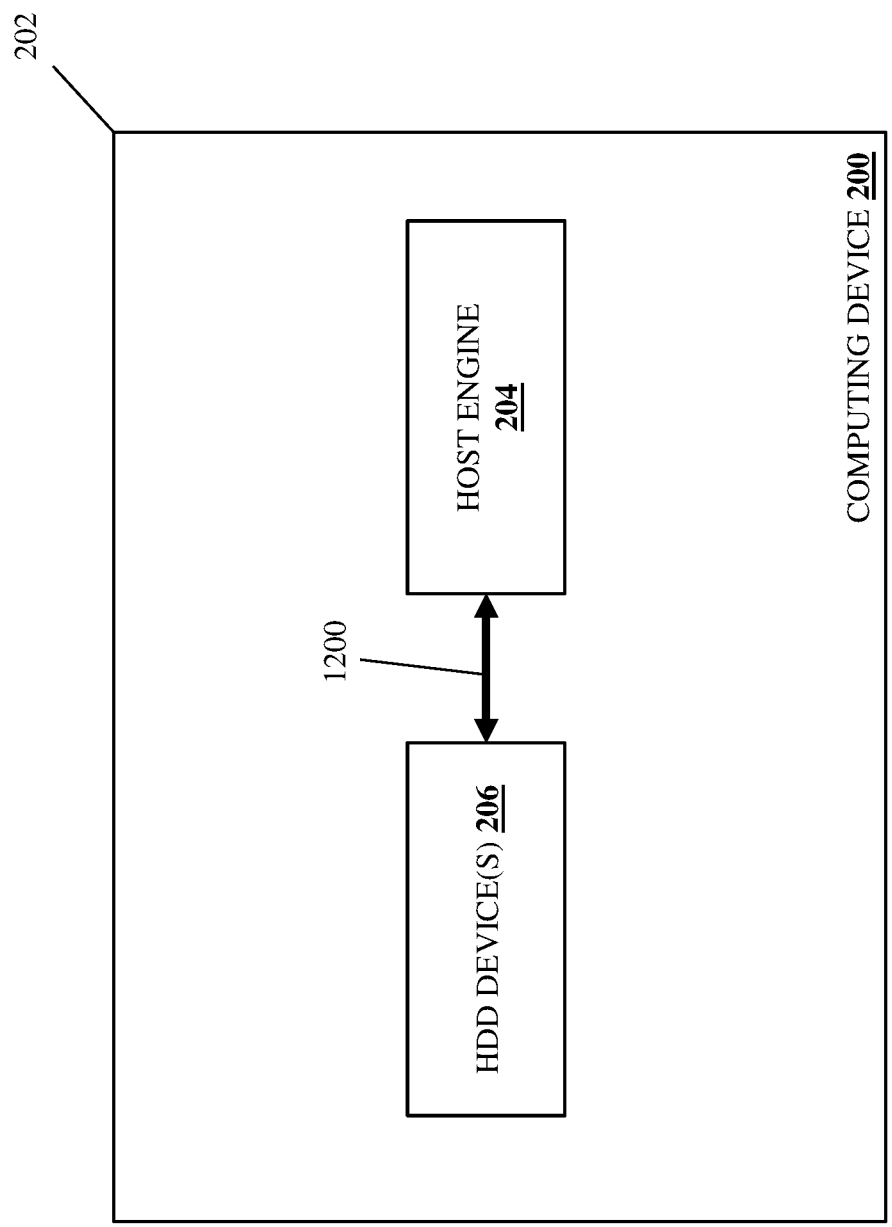
FIG. 12B is a schematic view illustrating an embodiment of the computing device of FIG. 2 operating during the method of FIG. 4.

If, at decision block 419, the host is configured to perform a data rebuild, the method 400 may proceed to block 421 where the HDD device and a host synchronize host data rebuild operations. With reference to FIGS. 12A and 12B, in an embodiment of block 421 and in situations in which the HDD device is not configured to perform data rebuild but the host engine 204 is configured to perform data rebuild, the HDD device self-healing engine 304 in the HDD device 300 may perform host data rebuild synchronization operations 1200 that may include exchanging host data rebuild communications via its communication system 310 and with the host engine 204 in order to synchronize with the host engine 204 the rebuilding of the data, which was stored on the HDD data storage resource 308a, on the HDD data storage resource 308b.

To provide a specific example, the host data rebuild communications transmitted by the HDD device self-healing engine 304 to the host engine 204 may identify the unavailability of the HDD data storage resource 308a to the host engine 204. In response, the host engine 204 may transmit host data rebuild communications to the HDD device self-healing engine 304 that instruct the HDD device self-healing engine 304 to perform logical address remapping operations that are similar to those performed at blocks 410 and 415, with the HDD device self-healing engine 304 performing those logical remapping operations as part of the host data rebuilt synchronization operations 1200. Prior to or following the logical address remapping operations, the host data rebuild communications transmitted by the HDD device self-healing engine 304 to the host engine 204 may identify the HDD data storage resource 308a to the host engine 204 (e.g., a list of the LBAs that are unavailable due to the unavailability of the HDD data storage resource 308a), as well any other information that would be apparent to one of skill in the art in possession of the present disclosure. As will be appreciated by one of skill in the art in possession of the present disclosure, the logical address remapping and identification of the HDD data storage resource 308a to the host engine 204 may allow the host engine 204 to rebuild the data stored on the HDD data storage resource 308a as described below. Furthermore, one of skill in the art in possession of the present disclosure will appreciate how a variety of other synchronization operations may be performed between the HDD device 300 and the host engine 204 to ensure that the data rebuilt by the host engine 204 is correct and up-to-date.

Figure 12C:
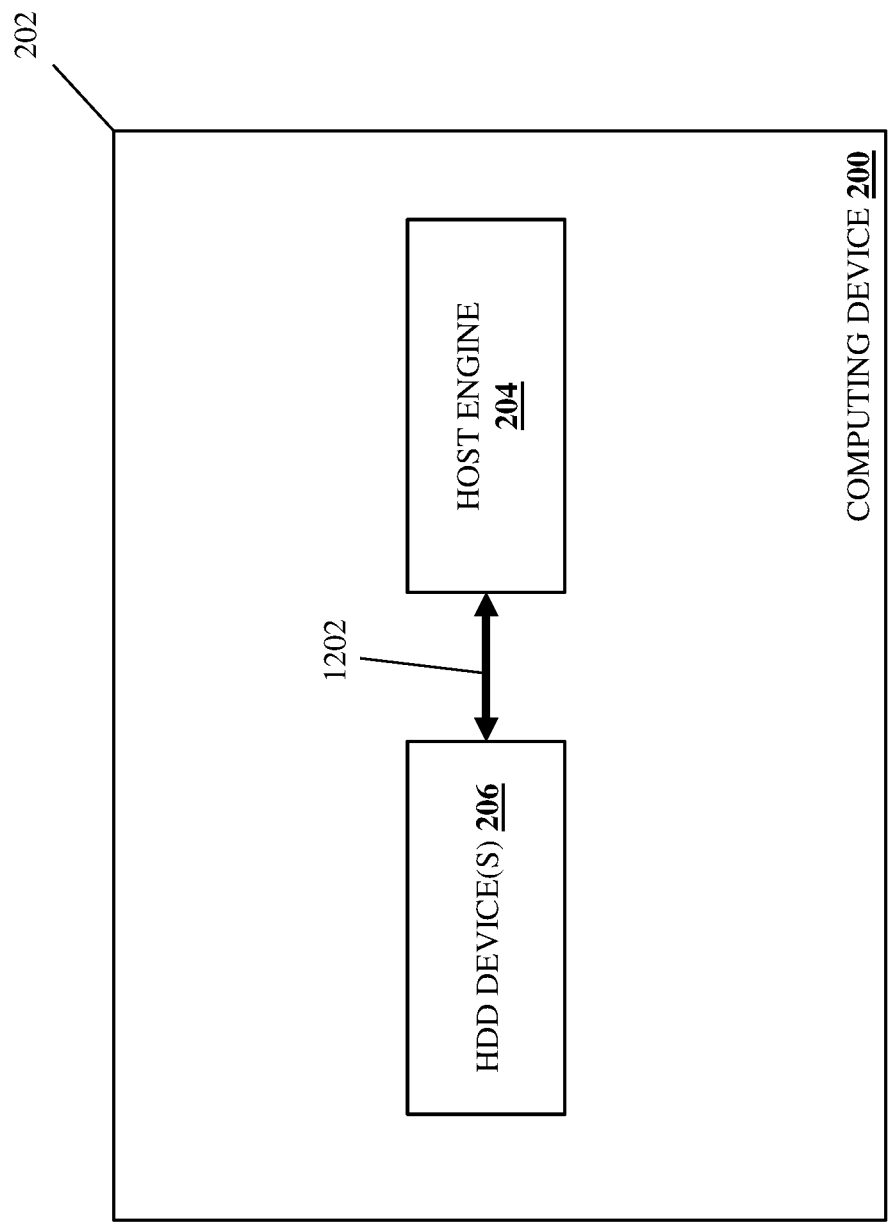
FIG. 12C is a schematic view illustrating an embodiment of the computing device of FIG. 2 operating during the method of FIG. 4.

The method 400 then proceeds to block 422 where the host rebuilds data associated with the HDD data storage resource that will be subsequently unavailable to generate rebuilt data. With reference to FIG. 12C, in an embodiment of block 422, the host engine 204 may then perform data rebuild operations 1202 using data stored on one or more of the HDD devices 206 in order to generate rebuilt data that is the same as the data that is stored on the unavailable HDD data storage resource 308a. In an embodiment, the data rebuild operations 1202 performed by the host engine 204 may include using the data stored on other HDD device(s) 206 (e.g., "primary" data and "parity data") to rebuild the data that was stored on the data storage surface provided by the HDD data storage resource 308a to generate rebuilt data (e.g., using RAID techniques). However, while a specific example is provided, one of skill in the art in possession of the present disclosure will appreciate how the host engine 204 may utilize a variety of data rebuild techniques at block 422 to rebuild the data that is stored on the unavailable HDD data storage resource 308a while remaining within the scope of the present disclosure as well.

Figure 12D:
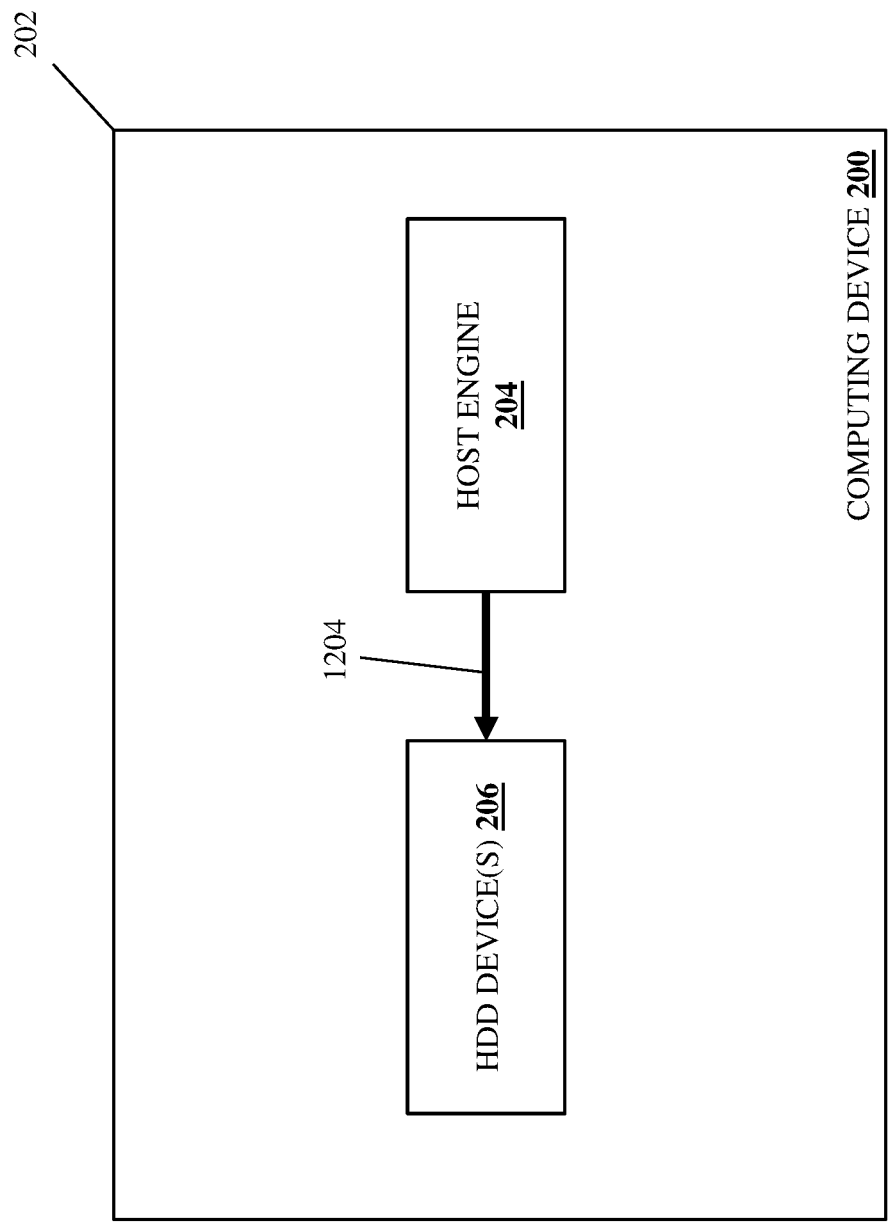
FIG. 12D is a schematic view illustrating an embodiment of the computing device of FIG. 2 operating during the method of FIG. 4.
Figure 12E:
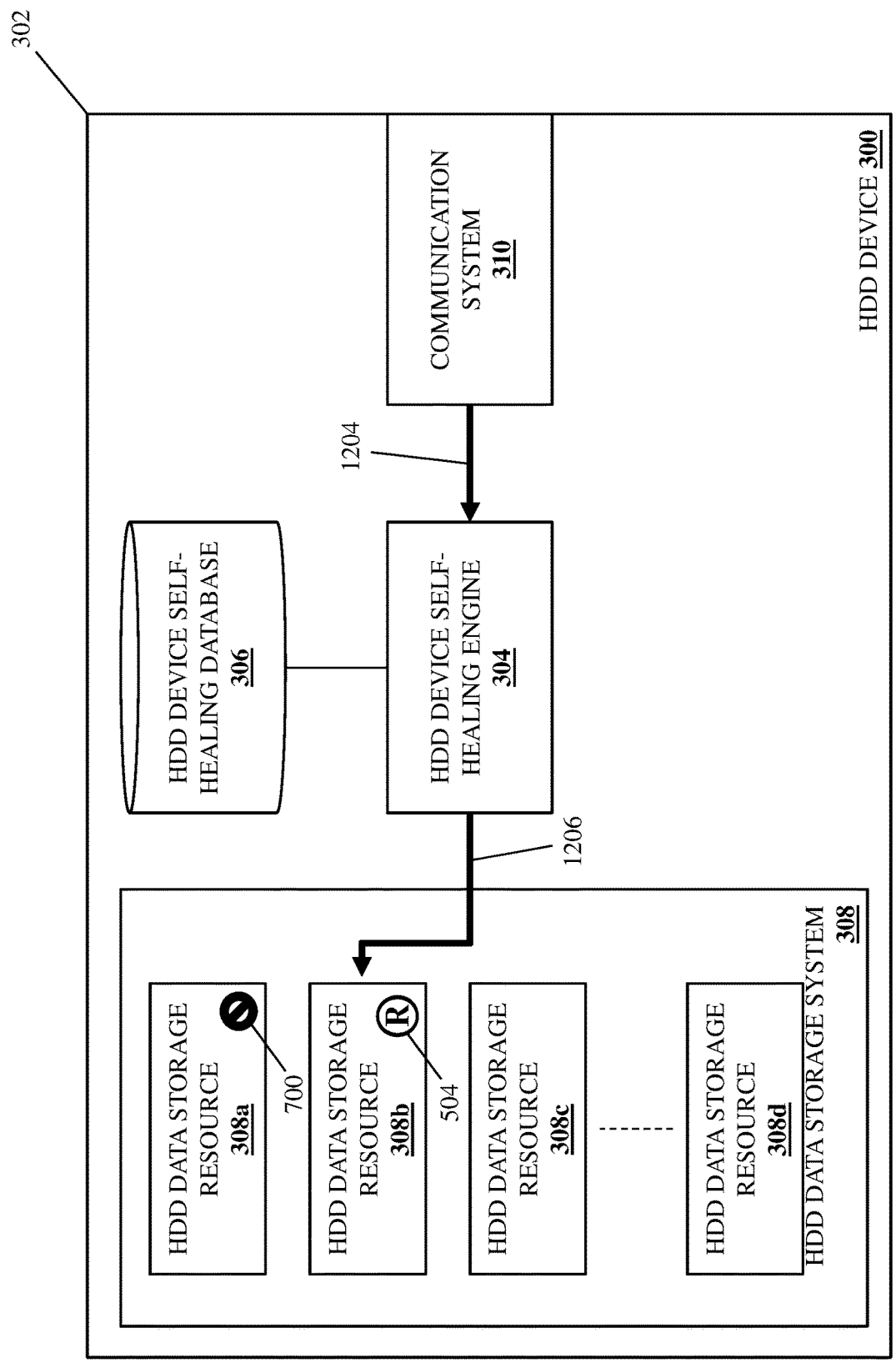
FIG. 12E is a schematic view illustrating an embodiment of the HDD device of FIG. 3 operating during the method of FIG. 4.

The method 400 then proceeds to block 424 where the host transmits the rebuilt data to the HDD device. With reference to FIGS. 12D and 12E, in an embodiment of block 424, the host engine 204 in the computing device 200 may perform rebuilt data transmission operations 1204 to transmit the rebuilt data to the HDD device 206/300 such that it is received by the HDD device self-healing engine 304 via its communication system 310, and one of skill in the art in possession of the present disclosure will appreciate how the host engine 204 may transmit subsets of rebuilt data to the HDD device self-healing engine 304 as those subsets of rebuilt data are generated while remaining within the scope of the present disclosure as well. As such, at block 422 the host engine 204 may utilize a list of the LBAs associated with the data stored on the data storage surface provided by the HDD data storage resource 308a that is unavailable to recover that data using conventional RAID techniques and the other HDD device(s) 206, and then at block 424 the host engine 204 may write that data back via those LBAs to the HDD device 300, with the logical address remapping operations performed by the HDD device self-healing engine 304 causing that data to be provided on the data storage surface in the HDD data storage resource 308b. Furthermore, one of skill in the art in possession of the present disclosure will appreciate how the host engine 204 may track data that is rebuilt and written to those LBAs, and handle any requests for those LBAs using rules that are similar to those described above.

The method 400 then proceeds to block 426 where the HDD device provides the rebuilt data on the reserved data storage resource. With reference to FIG. 12E, in an embodiment of block 426, the HDD device self-healing engine 304 in the HDD device 300 may perform rebuilt data writing operations 1206 that include writing the rebuilt data received from the host engine 204 (e.g., writing each subset of rebuilt data as it is received from the host engine 204) to the HDD data storage resource 308b, and one of skill in the art in possession of the present disclosure will appreciate how the HDD device self-healing engine 304 may write subsets of rebuilt data to the HDD data storage resource 308b as those subsets of rebuilt data are received from the host engine 204 while remaining within the scope of the present disclosure as well.

As will be appreciated by one of skill in the art in possession of the present disclosure, following the completion of the rebuilt data writing operations 1206, the HDD data storage system 308 in the HDD device 300 will have the same data storage capacity as prior to the unavailability of the HDD data storage resource 308a, with all the data that was previously stored in the HDD data storage resource 308a now available in the HDD data storage resource 308b via the same LBAs. Furthermore, once the HDD device self-healing engine 304 has completed the rebuilt data writing operations 1206, the method 400 may then return to block 404. As such, the method 400 may loop such that, in the event of a current unavailability of a read element provided by an HDD data storage resource and in situations in which the HDD device is not configured to perform data rebuild but the host is, the host rebuilds data currently stored on that unavailable HDD data storage resource to generate rebuilt data, and provides that rebuilt data to the HDD device so that the HDD device may write that rebuilt data to a reserved HDD data storage resource (e.g., as long as reserved HDD data storage resources are available in the HDD data storage system 308).

While not described herein in detail, one of skill in the art in possession of the present disclosure will appreciate how the data rebuild operations 1202 may fail in some situations. In the event of such a data rebuild operation failure, the HDD device 300 may be marked as a failed/unavailable HDD device and/or may be subject to other HDD data unavailability categorizations and/or configurations that would be apparent to one of skill in the art in possession of the present disclosure.

Thus, systems and methods have been described that provide for the reserving of HDD data storage resource(s) in an HDD data storage system of an HDD device for use in the event one of the HDD data storage resources currently being used in the HDD device fails or otherwise becomes unavailable. For example, the self-healing HDD system of the present disclosure may include a chassis housing an HDD device self-healing subsystem coupled to an HDD data storage system that includes a plurality of HDD data storage resources. The HDD device self-healing subsystem prevents data from being stored on a first HDD data storage resource that is included in the plurality of HDD data storage resources included in the HDD data storage system. When the HDD device self-healing subsystem determines that data storage operations using a second HDD data storage resource that is included in the plurality of HDD data storage resources will be subsequently unavailable, it remaps logical addresses associated with the second HDD data storage resource to the first HDD data storage resource, and provides the data that was stored using the second HDD data storage resource on the first HDD data storage resource. As such, when an HDD data storage resource currently being used in the HDD device becomes unavailable, the HDD device of the present disclosure may "self-heal" by providing its data on a reserved HDD data storage resource, thus allowing HDD devices (including those using new HDD technologies such as the HAMR technologies discussed above) to meet reliability requirements without introducing software stack issues, ensuring that HDD devices maintain fixed capacity for RAID (and similar) applications, and/or providing other benefits that will be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A self-healing Hard Disk Drive (HDD) system, comprising:
   a Hard Disk Drive (HDD) chassis;
   a Hard Disk Drive (HDD) data storage system that is housed in the HDD chassis and that includes a plurality of HDD data storage resources that each include the same HDD storage capacity; and
   an HDD device self-healing subsystem that is housed in the HDD chassis, that is coupled to the HDD data storage system, and that is configured to:
      reserve a first HDD data storage resource that is included in the plurality of HDD data storage resources included in the HDD data storage system to configure the first HDD data storage resource as a reserved first HDD data storage resource that is not used to store data for the HDD data storage system;
      report, to the HDD data storage system, a total HDD storage capacity provided by the HDD storage capacities of the plurality of HDD data storage resources without the reserved first HDD data storage resource;
      determine that data storage operations using a second HDD data storage resource that is included in the plurality of HDD data storage resources will be subsequently unavailable;
      remap logical addresses associated with the second HDD data storage resource to the first HDD data storage resource to configure the first HDD data storage resource to store data for the HDD data storage system;
      report, to the HDD data storage system, the total HDD storage capacity provided by the HDD storage capacities of the plurality of HDD data storage resources including the first HDD data storage resource and without the second HDD data storage resource such that the total HDD storage capacity reported to the HDD data storage system remains constant; and
      provide the data that was stored using the second HDD data storage resource on the first HDD data storage resource.

2. The system of claim 1, wherein each of the plurality of data storage resources includes at least one of:
   a write element;
   a read element; or
   a data storage surface.

3. The system of claim 1, wherein the second HDD data storage resource includes a second write element that will be subsequently unavailable and will prevent data storage write operations, and wherein the providing the data that was stored using the second HDD data storage resource on the first HDD data storage resource includes:
   copying the data that was stored using the second HDD data storage resource to the first HDD data storage resource that includes a first write element that will be subsequently available and will allow data storage write operations.

4. The system of claim 1, wherein the second HDD data storage resource includes a second read element that will be subsequently unavailable and will prevent data storage read operations, and wherein the providing the data that was stored using the second HDD data storage resource on the first HDD data storage resource includes:
  rebuilding the data that was stored using the second HDD data storage resource to generate rebuilt data; and
  writing the rebuilt data to the first HDD data storage resource that includes a first read element that will be subsequently available and will allow data storage read operations.

5. The system of claim 1, wherein the second HDD data storage resource includes a second read element that will be subsequently unavailable and will prevent data storage read operations, and wherein the providing the data that was stored using the second HDD data storage resource on the first HDD data storage resource includes:
  providing a data rebuild request to a host subsystem that is coupled to the self-healing HDD subsystem;
  receiving rebuilt data from the host subsystem; and
  writing the rebuilt data to the first HDD data storage resource that includes a first read element that will be subsequently available and will allow data storage read operations.

6. The system of claim 1, wherein the determining that the data storage operations using the second HDD data storage resource will be subsequently unavailable includes one of:
  determining that the data storage operations using the second HDD data storage resource are currently unavailable; or
  predicting that the data storage operations using the second HDD data storage resource will be subsequently unavailable within a threshold time period.

7. An Information Handling System (IHS), comprising:
  a processing system; and
  a memory system that is coupled to the processing system and that includes instructions that, when executed by the processing system, cause the processing system to provide a Hard Disk Drive (HDD) device self-healing engine that is configured to:
    reserve a first HDD data storage resource, which is included in a plurality of HDD data storage resources that are included in an HDD data storage system in an HDD device to configure the first HDD data storage resource as a reserved first HDD data storage resource that is not used to store data for the HDD data storage system;
    report, to the HDD data storage system, a total HDD storage capacity provided by the HDD storage capacities of the plurality of HDD data storage resources without the reserved first HDD data storage resource;
    determine that data storage operations using a second HDD data storage resource that is included in the plurality of HDD data storage resources will be subsequently unavailable;
    remap logical addresses associated with the second HDD data storage resource to the first HDD data storage resource to configure the first HDD data storage resource to store data for the HDD data storage system;
    report, to the HDD data storage system, the total HDD storage capacity provided by the HDD storage capacities of the plurality of HDD data storage resources including the first HDD data storage resource and without the second HDD data storage resource such that the total HDD storage capacity reported to the HDD data storage system remains constant; and
    provide the data that was stored using the second HDD data storage resource on the first HDD data storage resource.

8. The IHS of claim 7, wherein each of the plurality of data storage resources includes at least one of:
  a write element;
  a read element; or
  a data storage surface.

9. The IHS of claim 7, wherein the second HDD data storage resource includes a second write element that will be subsequently unavailable and will prevent data storage write operations, and wherein the providing the data that was stored using the second HDD data storage resource on the first HDD data storage resource includes:
  copying the data that was stored using the second HDD data storage resource to the first HDD data storage resource that includes a first write element that will be subsequently available and will allow data storage write operations.

10. The IHS of claim 7, wherein the second HDD data storage resource includes a second read element that will be subsequently unavailable and will prevent data storage read operations, and wherein the providing the data that was stored using the second HDD data storage resource on the first HDD data storage resource includes:
  rebuilding the data that was stored using the second HDD data storage resource to generate rebuilt data; and
  writing the rebuilt data to the first HDD data storage resource that includes a first read element that will be subsequently available and will allow data storage read operations.

11. The IHS of claim 7, wherein the second HDD data storage resource includes a second read element that will be subsequently unavailable and will prevent data storage read operations, and wherein the providing the data that was stored using the second HDD data storage resource on the first HDD data storage resource includes:
  providing a data rebuild request to a host subsystem that is coupled to the self-healing HDD subsystem;
  receiving rebuilt data from the host subsystem; and
  writing the rebuilt data to the first HDD data storage resource that includes a first read element that will be subsequently available and will allow data storage read operations.

12. The IHS of claim 7, wherein the determining that the data storage operations using the second HDD data storage resource will be subsequently unavailable includes one of:
  determining that the data storage operations using the second HDD data storage resource are currently unavailable; or
  predicting that the data storage operations using the second HDD data storage resource will be subsequently unavailable within a threshold time period.

13. The IHS of claim 7, wherein the HDD device self-healing engine is configured to:
  track the data that is being provided on the first HDD data storage resource;
  receive a request to perform a storage operation that is associated with the logical addresses that were remapped to the first HDD data storage resource; and
  perform the storage operation based on the tracking of the data that is being provided on the first HDD data storage resource.

14. A method for self-healing a Hard Disk Drive (HDD) device, comprising:
- reserving, by a Hard Disk Drive (HDD) device, a first HDD data storage resource, which is included in a plurality of HDD data storage resources that are included in an HDD data storage system in the HDD device to configure the first HDD data storage resource as a reserved first HDD data storage resource that is not used to store data for the HDD data storage system;
- reporting, by the HDD device to the HDD data storage system, a total HDD storage capacity provided by the HDD storage capacities of the plurality of HDD data storage resources without the reserved first HDD data storage resource;
- determining, by the HDD device, that data storage operations using a second HDD data storage resource that is included in the plurality of HDD data storage resources will be subsequently unavailable;
- remapping, by the HDD device, logical addresses associated with the second HDD data storage resource to the first HDD data storage resource to configure the first HDD data storage resource to store data for the HDD data storage system;
- report, to the HDD data storage system, the total HDD storage capacity provided by the HDD storage capacities of the plurality of HDD data storage resources including the first HDD data storage resource and without the second HDD data storage resource such that the total HDD storage capacity reported to the HDD data storage system remains constant; and
- providing, by the HDD device, the data that was stored using the second HDD data storage resource on the first HDD data storage resource.

15. The method of claim 14, wherein each of the plurality of data storage resources includes at least one of:
- a write element;
- a read element; or
- a data storage surface.

16. The method of claim 14, wherein the second HDD data storage resource includes a second write element that will be subsequently unavailable and will prevent data storage write operations, and wherein the providing the data that was stored using the second HDD data storage resource on the first HDD data storage resource includes:
- copying the data that was stored using the second HDD data storage resource to the first HDD data storage resource that includes a first write element that will be subsequently available and will allow data storage write operations.

17. The method of claim 14, wherein the second HDD data storage resource includes a second read element that will be subsequently unavailable and will prevent data storage read operations, and wherein the providing the data that was stored using the second HDD data storage resource on the first HDD data storage resource includes:
- rebuilding the data that was stored using the second HDD data storage resource to generate rebuilt data; and
- writing the rebuilt data to the first HDD data storage resource that includes a first read element that will be subsequently available and will allow data storage read operations.

18. The method of claim 14, wherein the second HDD data storage resource includes a second read element that will be subsequently unavailable and will prevent data storage read operations, and wherein the providing the data that was stored using the second HDD data storage resource on the first HDD data storage resource includes:
- providing a data rebuild request to a host subsystem that is coupled to the self-healing HDD subsystem;
- receiving rebuilt data from the host subsystem; and
- writing the rebuilt data to the first HDD data storage resource that includes a first read element that will be subsequently available and will allow data storage read operations.

19. The method of claim 14, wherein the determining that the data storage operations using the second HDD data storage resource will be subsequently unavailable includes one of:
- determining that the data storage operations using the second HDD data storage resource are currently unavailable; or
- predicting that the data storage operations using the second HDD data storage resource will be subsequently unavailable within a threshold time period.

20. The method of claim 14, further comprising:
- tracking, by the HDD device, the data that is being provided on the first HDD data storage resource;
- receiving, by the HDD device, a request to perform a storage operation that is associated with the logical addresses that were remapped to the first HDD data storage resource; and
- performing, by the HDD device, the storage operation based on the tracking of the data that is being provided on the first HDD data storage resource.

* * * * *